United States Patent [19]

Miyawaki

[11] Patent Number: 4,778,236
[45] Date of Patent: Oct. 18, 1988

[54] THIN FILM OPTICAL ELEMENT

[75] Inventor: Mamoru Miyawaki, Tokyo, Japan

[73] Assignee: Canon Kabushiki Kaisha, Tokyo, Japan

[21] Appl. No.: 774,579

[22] Filed: Sep. 10, 1985

[30] Foreign Application Priority Data

| Sep. 14, 1984 | [JP] | Japan | 59-192901 |
| Sep. 14, 1984 | [JP] | Japan | 59-192902 |
| Sep. 14, 1984 | [JP] | Japan | 59-192903 |
| Sep. 14, 1984 | [JP] | Japan | 59-192904 |
| Sep. 14, 1984 | [JP] | Japan | 59-192905 |
| Sep. 14, 1984 | [JP] | Japan | 59-192906 |
| Sep. 14, 1984 | [JP] | Japan | 59-192907 |
| Sep. 14, 1984 | [JP] | Japan | 59-192908 |
| Sep. 14, 1984 | [JP] | Japan | 59-192909 |
| Sep. 14, 1984 | [JP] | Japan | 59-192910 |
| Sep. 14, 1984 | [JP] | Japan | 59-192911 |
| Aug. 29, 1985 | [JP] | Japan | 60-190449 |
| Aug. 29, 1985 | [JP] | Japan | 60-190450 |
| Aug. 29, 1985 | [JP] | Japan | 60-190451 |
| Aug. 29, 1985 | [JP] | Japan | 60-190452 |
| Aug. 29, 1985 | [JP] | Japan | 60-190453 |

[51] Int. Cl.⁴ .................................. G02B 6/12
[52] U.S. Cl. .......................... 350/96.14; 350/96.12; 350/96.13
[58] Field of Search ............... 350/96.11, 96.12, 96.13, 350/96.14

[56] References Cited

U.S. PATENT DOCUMENTS

| 3,880,630 | 4/1975 | Izawa | 350/96.12 X |
| 3,996,576 | 12/1976 | Bullock | 350/96.12 X |
| 4,558,338 | 12/1985 | Sakata | 357/23.9 |
| 4,583,817 | 4/1986 | Papuchon | 350/96.14 |
| 4,585,299 | 4/1986 | Strain | 350/96.12 |
| 4,605,944 | 8/1986 | Ishii et al. | 357/17 |

OTHER PUBLICATIONS

Somekh et al, "Channel Optical Waveguides and Directional...", *Applied Optics*, vol. 13, No. 2, Feb. 1974, pp. 327-330.

Wei et al, "Large Refractive Index Change Induced by Ion...", *Appl. Phys. Lett.*, vol. 25, No. 6, Sep. 1974, pp. 329-331.

King et al, "Ion Implanted Optical Waveguides in LiNbO$_3$", *Electron Lett.*, vol. 17, No. 23, Nov. 1981, pp. 897-898.

Heibei et al, "Strip Waveguides in LiNbO$_3$ Fabricataed by...", *IEEE J.Q.E.*, vol. QE-18, No. 5, May 1982, pp. 820-825.

*Primary Examiner*—John Lee
*Attorney, Agent, or Firm*—Fitzpatrick, Cella, Harper & Scinto

[57] ABSTRACT

The thin film optical element comprises a substrate, a thin film light guide formed by ion injection into the surface of the substrate, an optical functional part formed in a part of the light guide for varying the refractive index thereof by an external effect to modulate or deflect the guided wave, and an optical connector part formed at the end of the light guide for guiding the light into or from the end face of said light guide, by differentiating the distribution of ion distribution between the optical connector part and the optical functional part.

33 Claims, 21 Drawing Sheets

THIN FILM OPTICAL ELEMENT

BACKGROUND OF THE INVENTION

1. Field of the Invention

The present invention relates to a thin film optical element and a method for producing the same.

2. Description of the Prior Art

Various researches have been conducted for applying thin film optical elements, i.e. optical elements utilizing thin film light guides, to light deflectors, light modulators, spectrum analyzers, light switches, etc. In such a thin film optical element, the refractive index of the light guide is varied by an external effect such as an acousto-optical effect or an electro-optical effect to modulate or deflect the light propagating in said light guide. The substrate for such optical element is often composed of lithium niobate ($LiNbO_3$) crystal or lithium tantalate ($LiTaO_3$) which shows excellent piezoelectric, acousto-optical and electro-optical effects and a low light propagation loss. A representative method of producing a thin film light guide with such crystalline substrate consists of thermally diffusing titanium (Ti), at a high temperature, in the surface of said crystalline substrate, thereby forming a light guide layer of a refractive index slightly higher than that of said substrate. However, the thin film light guide thus prepared often suffers from optical damage, thus only allowing entry of light of a very small power. The optical damage means a phenomenon in which the intensity of light taken out from the light guide after propagation therein does not increase proportionally, because of scattering, with the intensity of light entering said light guide.

As another method for avoiding such optical damage, there is a known ion exchange method in which a crystalline substrate (for example $LiNbO_3$ or $LiTaO_3$) is subjected to a low-temperature thermal treatment in a fused salt such as thalium nitrate ($TlNO_3$), silver nitrate ($AgNO_3$) or Potassium nitrate ($KNO_3$), or in a weak acid such as benzoic acid ($C_6H_5COOH$) to exchange lithium ions ($Li^+$) in said crystalline substrate with ions such as protons ($H^+$) of weak acid thereby obtaining a light guide with a large difference in the refractive index ($\Delta h: 0.12$). The threshold value of the optical damage of the thin film light guide prepared with such ion exchange method is several tens of times higher than that obtained by titanium diffusion, but said ion exchange treatment deteriorates the piezoelectric property and electro-optical effect specific to the crystal of $LiNbO_3$ or $LiTaO_3$, thus reducing the diffraction efficiency in the use as a light deflector.

In the formation of a light deflector or a light modulator utilizing acousto-optical or electro-optical effect, it is essential to improve the efficiency of such effect. A representative example utilizing acousto-optical effect consists of applying a high frequency electric field between comb electrodes formed by photolithography on a light guide, thus inducing a surface elastic wave on said light guide. In such structure, it is already known that the interaction between the surface elastic wave induced on the light guide and the light guided in said light guide becomes larger if the energy distribution of the guided light is enclosed in the vicinity of the surface of the substrate [C. S. Tsai, IEEE Transactions on Circuits and Systems, Vol. Cas.-26, 12, 1979].

On the other hand, the input or output of light between a semiconductor laser or an optical fiber and such light guide is conducted through the end face thereof, so that the energy distribution of the guided light has to be broadened in the thickness direction of the substrate, corresponding to the energy distribution in the optical fiber or the like, in order to improve the efficiency of optical connection.

Consequently conventional thin film optical elements have been unable to achieve a high efficiency in modulation or deflection and a high efficiency in optical connection at the same time, because the required energy distribution of the guided light is different between the optical connector part for input/output of light and the optical functional part for modulation or deflection of the guided light. Also in order to resolve this problem there has been proposed a method, in case of forming the light guide by titanium diffusion, by differentiating the concentration of titanium diffusion between the optical connector part and the optical functional part [M. Kondo, K. Komatsu & Y. Ohta; Society of Applied Physics 84 Spring Symposium, preprint 31a-K-7; and ibid.; 7th Topical Meeting on Integrated and Guided-Wave Optics TuA5-1]. However an effective method for avoiding the above-mentioned problem has not been known in the case where the light guide is formed by the aforementioned ion injection method.

SUMMARY OF THE INVENTION

The object of the present invention is to provide a thin film optical element showing a high efficiency of connection in the input and output of guided light and being capable of efficient modulation or deflection of light, and a method of producing such optical element.

The above-mentioned object can be achieved, according to the present invention, in a thin film optical element comprising a substrate, a thin film light guide formed by ion injection into the surface of said substrate, an optical functional part formed in a part of said light guide for varying the refractive index thereof by an external effect to modulate or deflect the guided wave, and an optical connector part formed at the end of said light guide for guiding the light into or from the end face of said light guide, by differentiating the distribution of ion distribution between said optical connector part and said optical functional part.

DETAILED DESCRIPTION OF THE PREFERRED EMBODIMENTS

Figure 1:
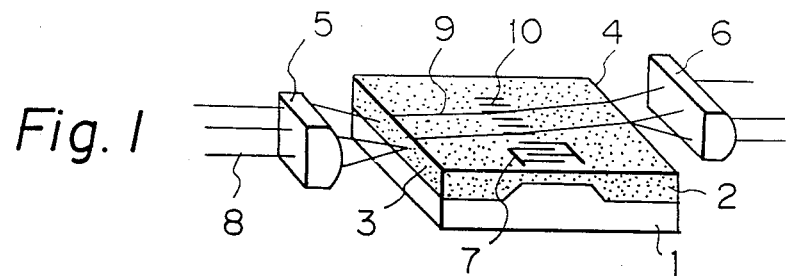
FIG. 1 is a perspective view showing a first embodiment of the optical element of the present invention.

FIG. 1 is a perspective view showing a first embodiment of a thin film optical element of the present invention utilizing an acousto-optical effect, wherein shown are an x- or y-type crystalline $LiNbO_3$ substrate 1; a light guide 2 formed by proton exchange; polished end faces 3, 4 of said light guide; cylindrical lenses 5, 6; and comb electrodes 7.

A parallel light beam 8 of a wavelength of 6328 Å obtained from a He-Ne laser is focused, in the thickness direction of the light guide 2 by means of the cylindrical lens 5, onto the end face 3 of the light guide, thus being admitted thereto. Light 9 guided from said end face 3 is diffracted by a surface elastic wave 10 generated by applying a high frequency power to the comb electrodes 7, and the diffracted light emerges from the end face 4 of the light guide and is converted into a parallel beam by the cylindrical lens 6. A combination efficiency as high as 80% is achievable since the width, in the direction of focusing, of the focused beam on the end face 3 of the light guide is approximately equal to the width of the guided light.

In the light guide 2, the injection depth of protons gradually decreases in the direction of thickness of the substrate, from the optical connector parts in the vicinity of the end faces 3, 4 toward the optical functional part where the interaction between the surface elastic wave 10 and the guided light 9 takes place as shown in FIG. 1, so that the guided light is enclosed, in said optical functional part, in the vicinity of the surface of the substrate to achieve a high diffracting effect.

FIGS. 2(a)-2(f) are schematic cross sectional views showing the process for preparing a thin film optical element as shown in FIG. 1.

Figure 2A:
FIGS. 2(a)–2(f) are schematic cross sectional views showing an example of preparation process of said first embodiment.
Figure 2B:
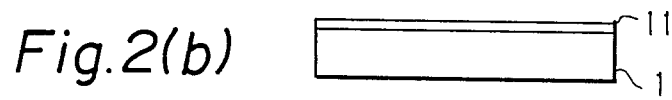

At first, as shown in FIG. 2(a), an x- or y-surface of an x- or y-type $LiNbO_3$ substrate 1 is polished to a flatness of several Newton rings or less, then subjected to ordinary ultrasonic washing with acetone and then with purified water, and dried by nitrogen gas blowing. Subsequently a titanium film of a thickness of 200 Å is deposited on said surface by electron beam evaporation, and subjected to thermal diffusion for 2.5 hours at 965° C. in an oxygen atmosphere to form a Ti thermal diffusion layer 11 as shown in FIG. 2(b). Other metals such as V, Ni, Au, Ag, Co, Nb or Ge may also be employed for said thermal diffusion.

Figure 2C:
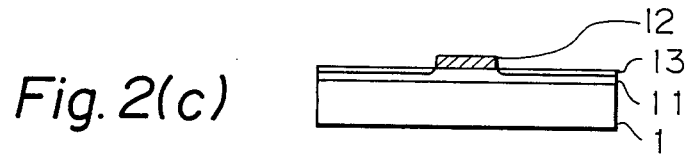

Then, as shown in FIG. 2(c), a chromium film 12 is evaporated, as a mask for proton exchange treatment, in the optical functional part where the interaction between the surface elastic wave and the guided light takes place. The $LiNbO_3$ substrate bearing said mask is placed in an alumina crucible containing benzoic acid added with lithium benzoate in 2% amount in molar ratio, and said crucible is maintained at 250° C. for 5 hours in a furnace to effect ion exchange treatment, thus forming a proton exchange layer 13 in a part of the Ti diffusion layer 11 not covered by the mask, as shown in FIG. 2(c). In the formation of said proton exchange layer, the mixture of benzoic acid and lithium benzoate may be replaced by another mixture of a carboxylic acid with a dissociation constant of $10^{-6}$ to $10^{-3}$ and a lithium salt thereof, for example a mixture of palmitic acid $[CH_3(CH_2)_{14}COOH]$ and lithium palmitate $[CH_3(CH_2)_{14}COOLi]$ or a mixture of stearic acid $[CH_3(CH_{26})_{16}COOH]$ and lithium stearate $[CH_3(CH_2)_{16}COOLi]$. Various samples have been prepared by modifying the molar ratio of the lithium-containing substance in a range from 1% to 10%. The substrate is then subjected to ultrasonic washing with ethanol, and dried by nitrogen blowing, and the mask is removed by etching.

Figure 2D:
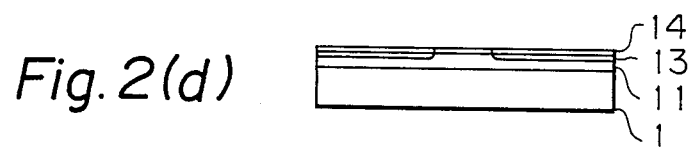

After the above-explained proton exchange treatment, the substrate is subjected to another proton exchange treatment for 1 hour at 250° C. with benzoic acid added with lithium benzoate in 1% amount in molar ratio to form a proton exchange layer 14 as shown in FIG. 2(d). Also in this proton exchange treatment, there may be employed a mixture of palmitic acid and lithium palmitate or a mixture of stearic acid and lithium stearate. After said proton exchange, the substrate is again subjected to ultrasonic washing with ethanol and dried by nitrogen blowing.

Figure 2E:
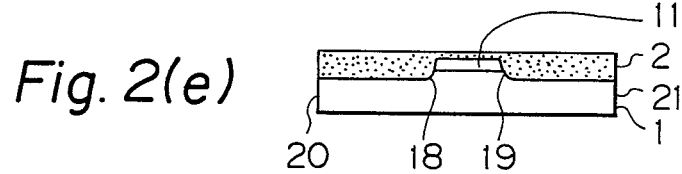

Subsequently the crystalline substrate after two proton exchanges is subjected to an annealing treatment for 4 hours at 350° C. in a furnace, in a moist oxygen atmosphere of a flow rate of 1.0 liter/min., obtained by passing oxygen through heated water. In this manner, there is obtained, as shown in FIG. 2(e), a light guide 2 of which proton injection depth is smaller in the optical functional part and larger toward the end faces 20, 21 of the substrate. The proton distribution at the boundaries 18, 19 of said optical functional part shows gradual change because of the annealing treatment, and a low propagation loss in this part has been experimentally confirmed.

The annealing condition may be different from that indicated before, but should preferably be selected in such a manner that the absorption peak of OH radical in the optical functional part lies in a range from 3480 to 3503 cm$^{-1}$.

Figure 2F:
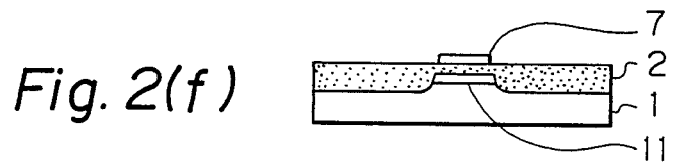

Finally comb electrodes 7 are formed on the above-mentioned light guide 2 as shown in FIG. 2(f), by an ordinary photolithographic process.

In the above-described embodiment, the light guide is formed by titanium diffusion and thermal proton diffusion, but Ti diffusion is not indispensable. Instead, the light guide may be formed by injection or thermal diffusion of protons alone, or by external diffusion of LiO combined with injection or thermal diffusion of protons.

In the following there will be explained another method for producing a thin film optical element as shown in the foregoing first embodiment.

Figure 3A:
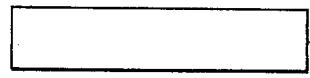
FIGS. 3(a)–3(f) are schematic cross sectional views showing another example of preparation process.
Figure 3B:
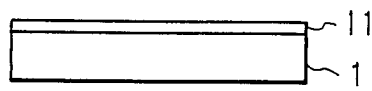

At first, as shown in FIG. 3(a), a Ti film is deposited by evaporation on the x- or y-surface of an x- or y-type LiNbO$_3$ substrate, and is thermally diffused in an oxygen atmosphere to form a Ti thermal diffusion layer 11 as shown in FIG. 3(b).

Figure 3C:
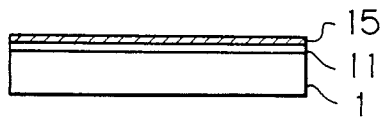
Figure 3D:
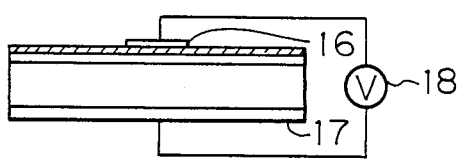

Subsequently said substrate after Ti diffusion is subjected to proton exchange in a solution containing benzoic acid and lithium benzoate to form a proton exchange layer 15 as shown in FIG. 3(c). Then, as shown in FIG. 3(d), a gold film 16 is evaporated in the area of interaction between the surface elastic wave and the guided light, and another gold film 17 is evaporated on the rear surface of the substrate. Then the substrate is subjected to an annealing treatment at 350° C. in a furnace, in a moist oxygen atmosphere of a flow rate of 0.5 liter/min. obtained by flowing oxygen through heated water, and in the presence of a voltage, applied across said gold films 16, 17 from a voltage source 18, of such polarity as to suppress thermal diffusion of protons into the substrate.

Figure 3E:
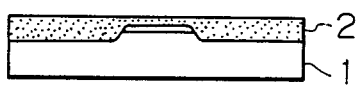

In this manner a light guide 2 as shown in FIG. 3(e) is formed since the proton diffusion is enhanced in the optical connector parts in the vicinity of the end faces of the light guide but is shallower in the above-mentioned area where the proton diffusion is suppressed by the electric field.

Figure 3F:
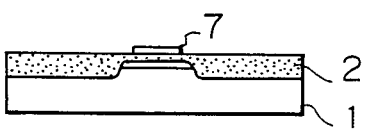

Finally comb electrodes 7 with a central frequency of 400 MHz are formed by an ordinary photolithographic process as shown in FIG. 3(f).

Figure 4:
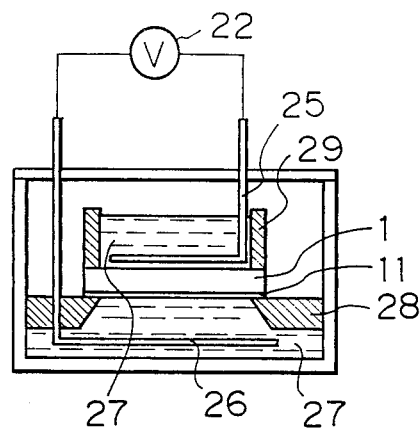
FIG. 4 is a schematic cross sectional view of an apparatus to be employed in the process shown in FIG. 3.

The application of electric field to the substrate in the above-described process is effected at the annealing treatment, but it may also be effected at the proton exchange in an apparatus shown in FIG. 4, prior to the proton exchange. In FIG. 4, there are shown electrodes 25, 26, a mixed solution 27 of benzoic acid and lithium benzoate, and jigs 28, 29 for fixing the substrate, and the proton exchange can be conducted within a shorter time in the presence of a voltage across the electrodes 25, 26.

In the above-described method, the ion injection by thermal diffusion or ion exchange is effected in the presence of an electric field applied to the substrate, so that the depth of ion injection can be easily regulated by the adjustment of the applied voltage.

Figure 5:
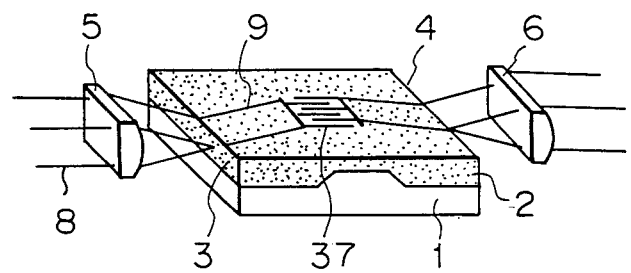
FIGS. 5 and 6 are perspective views showing second and third embodiments of the present invention.

FIG. 5 is a schematic view of a 2nd embodiment in which the element of FIG. 1 is used as a light deflector utilizing an electro-optical effect, wherein the same components as those in FIG. 1 are represented by same numbers and will not be explained in detail in the following.

A laser beam 8 is admitted to a light guide by focusing, in the direction of thickness thereof by a cylindrical lens 5, onto a polished end face 3 of the light guide. The light 9 guided from said end face is diffracted by a phase grating generated by a voltage applied to electro-optical effect comb electrodes 37, then emerges from another end face 4 of the light guide and is converted into a parallel beam by a cylindrical lens 6. The comb electrodes employed in this embodiment have 350 pairs of electrodes with a width and a spacing of 2.2 μm and an overlapping width of 3.8 mm. A diffraction efficiency as high as 90% is obtained by applying a voltage of 5 V between said comb electrodes.

The depth of ion injection or thermal diffusion in the foregoing embodiments is larger in the optical connector parts than in the optical functional part, but the configuration may be inversed depending on the ion to be injected.

Figure 6:
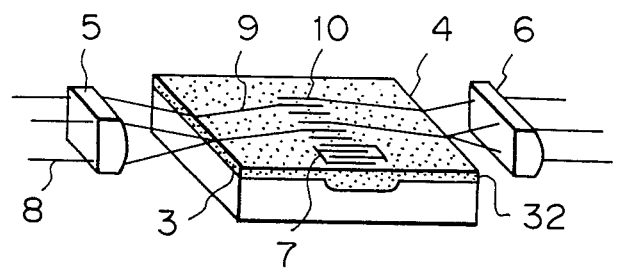

FIG. 6 is a perspective view of a 3rd embodiment of the thin film optical element of the present invention, wherein the same components as those in FIG. 1 are represented by same numbers and will not be explained in detail in the following. A light guide 32, different from the first embodiment, is formed by helium ion (He$^+$) injection. As in the case of proton injection, helium ion injection increases the refractive index, thus forming a light guide.

Figure 7:
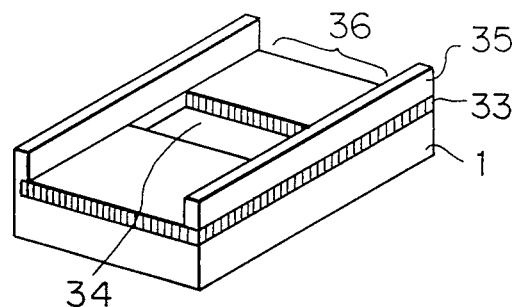
FIG. 7 is a perspective view showing a mask employed in the preparation of the embodiment shown in FIG. 6.

Now reference is made to FIG. 7 for explaining a method for producing the element of the 3rd embodiment.

At first, on an x- or y-type crystalline LiNbO$_3$ substrate 1, a zinc oxide film 33 of a thickness of ca. 0.5 microns is formed by high frequency sputtering, and is removed in an area 34 of interaction of the surface elastic wave and the guided light by means of ordinary photolithography and chemical etching. A resist film 35 of a thickness of ca. 1.3 μm is formed on said zinc oxide film 33 and is removed by a photolithographic process over a width 36. Consequently a composite mask of films 33, 35 is absent in the area 34, present as a single layer in the area of a width 36, and present as double layers in the outside area.

Thus, with ion injection through said composite mask, a light guide 32 of different depths respectively is obtained in the optical connector parts and in the optical functional part as shown in FIG. 6, due to different mask thicknesses in different locations. Helium ion injection is effected with an acceleration energy of 200 keV.

The depth of ion injection in the present embodiment is smaller in the optical connector parts than in the optical functional part, but the light migration from the light guide is relatively large because the difference in refractive index obtained by helium ion injection is smaller than that in case of proton injection, so that the actual energy distribution of the guided light in the optical connector parts is more spread into the substrate than in the optical functional part. Consequently, also in this embodiment, it is possible to achieve a high efficiency of connection in the optical connector parts and a high diffraction efficiency in the functional part at the same time, as in the first embodiment.

The LiNbO$_3$ substrate in the foregoing embodiments can be replaced by a lithium tantalate substrate (LiTaO$_3$) to obtain the thin film optical element of the present invention through an identical process. Furthermore, instead of such dielectric substrate, there may be employed a semiconductor substrate as will be explained in the following.

Figure 8:
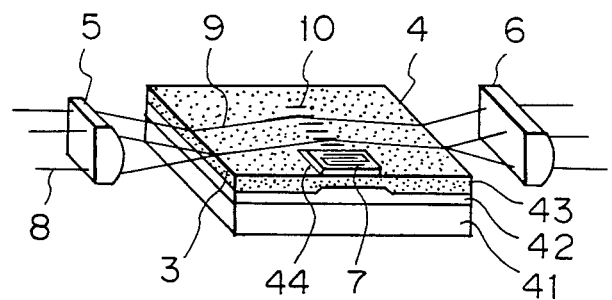
FIGS. 8 and 9 are perspective views showing fourth and fifth embodiments of the present invention.

FIG. 8 is a perspective view of a 4th embodiment of the thin film optical element of the present invention, wherein the same components as those in FIG. 1 are represented by same numbers and will not be explained further. There are shown a gallium arsenide (GaAs) substrate 41; a buffer layer 42 of aluminum gallium arsenide (AlGaAs); a light guide 43 of gallium arsenide-aluminum gallium arsenide (GaAs-AlGaAs) with a profile in the injected carrier distribution; and a zinc oxide (ZnO) film 44 with a tapered structure on a side thereof. A high frequency field applied to comb electrodes 7 formed on said zinc oxide film induces a surface elastic wave 10 thereon, and said wave is transmitted through said tapered structure and propagates on the light guide 43 to diffract the guided light 9 therein. The optical connector parts in said light guide 43 in the vicinity of the end faces 3, 4 thereof have a higher carrier concentration and a larger depth of doping, so that the effective refractive index in said parts is smaller than in the optical functional part of interaction between the surface elastic wave and the guided light. Consequently the energy distribution of the guided light is expanded in the optical connector parts to achieve a high connecting efficiency and is concentrated to the surface in the functional part to achieve a high diffraction efficiency.

The present invention is not limited to the foregoing embodiments but is subject to various applications. As an example, the light guide may be formed as channels each of which can be switched in the optical functional part. Also the modulation or deflection of light can be achieved not only by the aforementioned acousto-optical or electro-optical effect but also by diffraction with a magnetostatic surface wave caused by magneto-optical effect, or by a thermo-optical effect.

The preparation of the light guide by ion injection as explained before may cause, as already explained in the description of the prior technology, a deterioration in the piezoelectric and electro-optical properties of the crystal, thus leading to a loss in the diffraction efficiency of the guided light. In such case, such loss in the diffraction efficiency can be prevented by avoiding ion injection in an area of the substrate and forming the comb electrodes in said area. Such embodiment will be explained in the following.

Figure 9:
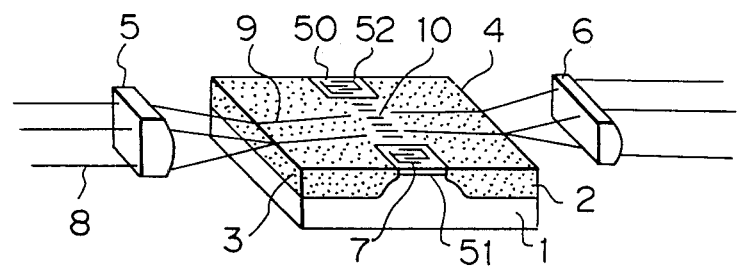

FIG. 9 is a perspective view showing a 5th embodiment of the thin film optical element of the present invention, utilizing an acousto-optical effect, wherein shown are an x- or y-type LiNbO$_3$ substrate 1; a light guide 2 formed by proton exchange; polished end faces 3, 4 of said light guide; cylindrical lenses 5, 6; comb electrodes 7, 50; and titanium diffused areas 51, 52 without proton injection.

A parallel beam 8 of a wavelength 6328 Å from a He-Ne laser is admitted to the light guide, by focusing in the direction of thickness thereof by the cylindrical lens 5, onto the polished end face 3 of the light guide.

The light 9 guided from said end face is diffracted by the surface elastic wave 10 generated by a high frequency field applied to the comb electrodes 7, and the diffracted light emerges from the end face 4 and is converted into a parallel beam by the cylindrical lens 6. A connection efficiency as high as 80% is obtained as the width of focused beam in the direction of focusing on the end face 3 approximately matches the width of the guided light. The comb electrodes 50 are used for receiving the surface elastic wave generated by the comb electrodes 7.

The proton injection depth of the light guide 2 progressively decreases from the optical connector parts in the vicinity of the end faces 3, 4 toward the optical functional part where the interaction between the surface elastic wave 10 and the guided light 9 takes place, whereby the guided light is enclosed in said functional part in the vicinity of the surface of the substrate to achieve a high diffraction efficiency.

The aforementioned comb electrodes 7, 50 are formed on the titanium diffusion layer of the areas 51, 52 without proton injection, so that deterioration of piezoelectric property due to proton injection is not encountered. Consequently it is possible to achieve a high efficiency in light modulation or deflection by generating the surface elastic wave with a low voltage.

FIGS. 10(a)-10(g) are schematic cross sectional views showing a method for producing the thin film optical element shown in FIG. 9.

Figure 10A:
FIGS. 10(a)–10(g) are schematic cross sectional views showing an example of the preparation process of the fifth embodiment.
Figure 10B:
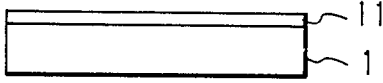

At first, as shown in FIG. 10(a), a y- or x-surface of a y- or x-type LiNbO$_3$ substrate 1 is polished to a flatness of several Newton rings or less, then subjected to ordinary ultrasonic washing with acetone and then with purified water, and dried by nitrogen gas blowing. Subsequently a titanium film of a thickness of 200 Å is deposited on said surface by electron beam evaporation, and subjected to thermal diffusion for 2.5 hours at 965° C. in an oxygen atmosphere to form a Ti thermal diffusion layer 11 as shown in FIG. 10(b).

Figure 10C:
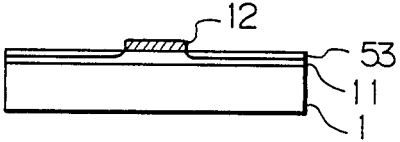

Then, as shown in FIG. 10(c), a chromium film 12 is evaporated, as a mask for proton exchange treatment, in the optical functional part where the interaction between the surface elastic wave and the guided light takes place. The LiNbO$_3$ substrate bearing said mask is then placed in an alumina crucible containing benzoic acid added with lithium benzoate in 2% amount in molar ratio, and said crucible is maintained at 250° C. for 5 hours in a furnace to effect ion exchange treatment, thus forming a proton exchange layer 53 in a part of the Ti diffusion layer 11 not covered by the mask, as shown in FIG. 10(c). The substrate is then subjected to ultrasonic washing with ethanol, and dried by nitrogen blowing, and the mask is removed by etching.

Figure 10D:
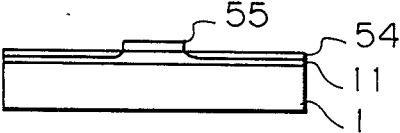

Then, as shown in FIG. 10(d), a chromium film 55 is deposited in areas where the electrodes are to be formed, and the substrate is subjected to a proton exchange treatment for 1 hour at 250° C. with benzoic acid added with lithium benzoate in 1% amount in molar ratio to form a proton exchange layer 54. Then the substrate is again subjected to ultrasonic washing with ethanol, and dried by nitrogen gas blowing, and said film 55 is removed by etching.

Figure 10E:
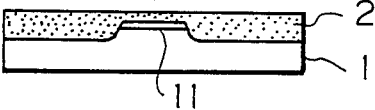
Figure 10F:
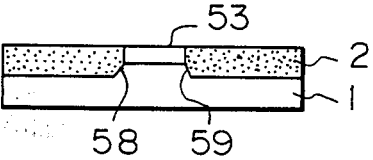

The substrate after two proton exchanges is then subjected to an annealing treatment for 4 hours at 350° C. in a furnace, in a moist oxygen atmosphere of a flow rate of 1.0 liter/min. obtained by passing oxygen through heated water, thereby forming a light guide 2 of which proton injection depth is smaller in the optical functional part and progressively larger toward the end faces of the substrate as shown in FIG. 10(e). The proton distribution at the boundaries 58, 59 of said functional part shows gradual change because of the annealing treatment, and a low propagation loss in this part has been experimentally confirmed.

The titanium diffusion layer 53 remains without proton injection in the areas where the electrodes are to be formed, since said areas are covered with the mask also in the second proton exchange.

Figure 10G:
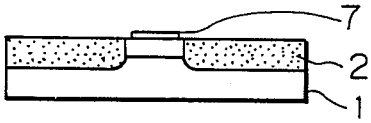

Finally comb electrodes 7 are formed by ordinary photolithographic process on said titanium diffusion layer 53 as shown in FIG. 10(g).

Figure 11:
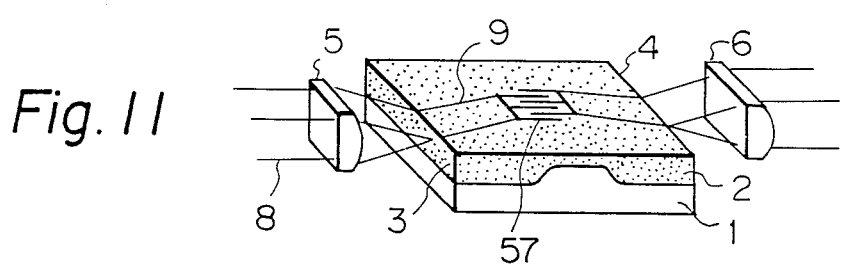
FIG. 11 is a perspective view showing a sixth embodiment of the present invention.

FIG. 11 is a schematic view of a 6th embodiment in which the element of FIG. 9 is used as a light deflector utilizing an electro-optical effect, wherein the same components as those in FIG. 9 are represented by same numbers and will not be explained in further detail.

A laser beam 8 is connected to a light guide 2 by focusing, in the direction of thickness thereof by a cylindrical lens 5, onto a polished end face 3 of the light guide. The light 9 guided from said end face is diffracted by a phase grating generated by a voltage applied to electro-optical effect comb electrodes 57, then emerges from another end face 4 of the light guide and is converted into a parallel beam by a cylindrical lens 6.

Though not illustrated, the area of the comb electrodes 57 has no proton injection.

Now reference is made to FIG. 12 for explaining a method for producing the element shown in FIG. 11. At first, as shown in FIG. 12(a), an x-type crystalline LiNbO₃ substrate (dimension: 1 mm in x-direction and 1 inch in y- and z-direction) is polished to a flatness of several Newton rings or less on a surface thereof, for example x-surface, then subjected to ordinary ultrasonic washing with methanol, acetone and purified water, and dried by nitrogen gas blowing.

Figure 12A:
FIGS. 12(a)-12(f) are schematic cross sectional views showing an example of the preparation process of the sixth embodiment.
Figure 12B:

Subsequently a titanium film of a thickness of 200 Å is deposited on the dried surface by electron beam evaporation, and the substrate, set on a fused quartz holder, is set in a thermal diffusion furnace of 965° C. As atmosphere dried oxygen gas is introduced into the furnace at a flow rate of 1 liter/min, the furnace temperature is elevated from room temperature to 965° C. at a rate of 16° C./min. for 1 hour, and then maintained at a constant value of 965° C. for 2.5 hours. The content is then moved to a second thermal diffusion furnace of 600° C. and cooled spontaneously by discontinuing the power supply to the second furnace. In this manner a titanium thermal diffusion layer 11 is formed on the substrate 1 as shown in FIG. 12(b).

Figure 12C:

After washing and drying of the substrate, a positive photoresist is coated with a thickness of 1–1.5 μm with a spinner, then exposed to the patterns of the comb electrodes through a negative mask, and developed to remove said photoresist corresponding to said patterns. After washing with water and drying, the substrate is set in a vacuum evaporation apparatus and a gold film of a thickness of 1,500 Å is deposited by electron beam evaporation in a vacuum of $1 \times 10^{-6}$ Torr. After said evaporation, the substrate is immersed in acetone for several minutes to lift off the gold film on the photoresist, thereby obtaining the comb electrodes 64 on the substrate as shown in FIG. 12(c). The comb electrodes in this embodiment have 350 pairs of electrodes, with a width and a spacing of 2.2 μm and an interlocking width of 3.8 mm.

Figure 12D:
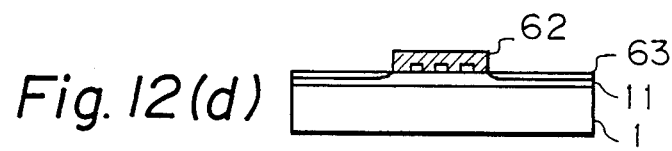

Then, as shown in FIG. 12(d), a chromium film 62 covering the comb electrodes 64 is evaporated as a mask for proton exchange treatment. The LiNbO₃ substrate bearing said mask is then placed in an alumina crucible containing benzoic acid added with lithium benzoate in 2% amount in molar ratio, and said crucible is maintained at 250° C. for 5 hours in a furnace to effect ion exchange treatment, thus forming a proton exchange layer 63 in a part of the Ti diffusion layer 11 not covered by the mask, as shown in FIG. 12(d). The substrate is then subjected to ultrasonic washing with ethanol, and dried by nitrogen gas blowing, and the mask is removed by etching with a chromium etching solution.

Figure 12E:
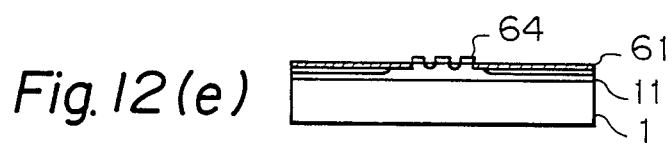

Then, the substrate bearing the gold comb electrodes after proton exchange is subjected to another proton exchange for 1 hour at 250° C. with benzoic acid added with lithium benzoate in 1% amount in molar ratio to obtain, as shown in FIG. 12(e), a proton exchange layer 61 in the area not covered by the comb electrode 64. Then the substrate is again subjected to ultrasonic washing with ethanol and dried by nitrogen gas blowing.

Finally, the substrate after two proton exchanges is subjected to an annealing treatment for 4 hours at 350° C. in a furnace, in a moist oxygen atmosphere of a flow rate of 1.0 liter/min. obtained by passing oxygen through heated water.

Figure 12F:
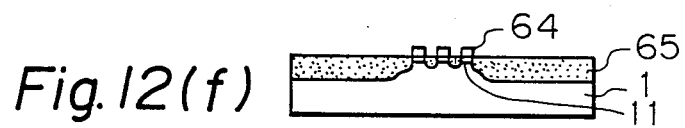

Thus, there is obtained the thin film optical element of the 6th embodiment in which, as shown in FIG. 12(f), the depth of proton thermal diffusion is different between the optical connector parts and the optical functional part and the area of comb electrodes lacks proton injection.

A diffraction efficiency as high as 90% is obtained by a low voltage of 5 V applied to said comb electrodes. The connection efficiency at the end faces of the light guide is as high as 80%, as in the 5th embodiment.

The light guide in the foregoing embodiment is formed by titanium diffusion and thermal proton diffusion, but the titanium diffusion is not indispensable, and the light guide may also be formed by injection or thermal diffusion of protons alone, or by external diffusion of LiO combined with injection or thermal diffusion of protons. It is furthermore possible, as will be explained in the following, to prepare a further efficient optical element by varying the diffusion concentration of a metal such as titanium between the optical connector parts and the optical functional part.

Figure 13:
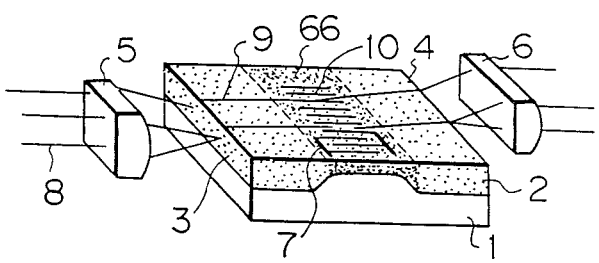
FIG. 13 is a perspective view showing a seventh embodiment of the present invention.

FIG. 13 is a perspective view showing a 7th embodiment of the optical element of the present invention, wherein the same components as those in FIG. 1 are represented by same numbers and will not explained in further detail. The present embodiment differs from the first embodiment, in having a high Ti concentration area 66 whereby the concentration of titanium is higher in the functional part than in the optical connector parts. Also in the present embodiment, a high connection efficiency of 80% in the optical connector parts is achievable as in the first embodiment. Also because of the progressively smaller depth of proton injection in the optical functional part for interaction between the surface elastic wave and the guided light 9 and because of the higher concentration of titanium in said part, the guided light in said functional part is enclosed in the vicinity of the surface of the substrate to achieve a high diffraction efficiency.

FIGS. 14(a)–14(f) are schematic cross sectional views showing a method for producing the thin film optical element shown in FIG. 13.

Figure 14A:
FIGS. 14(a)-14(f) are schematic cross sectional views showing an example of the preparation process of the seventh embodiment.
Figure 14B:
Figure 14C:
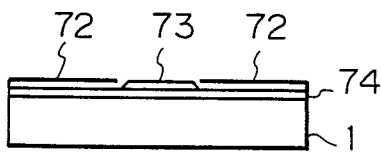

At first, as shown in FIG. 14(a), a y- or x-surface of a y- or x-type crystalline LiNbO$_3$ substrate 1 is polished to a flatness of several Newton rings or less, then subjected to ordinary ultrasonic washing with acetone and then with purified water, and dried by nitrogen gas blowing. Then, a titanium film 74 of a thickness of 100 Å is deposited on said surface by electron beam evaporation, as shown in FIG. 14(b). Subsequently the substrate is covered with a mask 72 having an aperture in the optical functional part alone as shown in FIG. 14(c), and subjected to evaporation of a titanium film again to form a titanium platform 73 of a central thickness of 500 Å.

Figure 14D:

Then said substrate is subjected to a thermal diffusion treatment for 6 hours at 965° C. in an oxygen atmosphere to form, as shown in FIG. 14(d), a titanium thermal diffusion layer 67, including an area 66 of a higher titanium concentration where the optical functional part is to be formed later. Another metal such as V, Ni, Au, Ag, Co, Nb or Ge may also be employed instead of Ti for said thermal diffusion.

Figure 14E:

The LiNbO$_3$ substrate containing the titanium diffusion layer 67 shown in FIG. 14(d) is then placed in an alumina crucible containing benzoic acid added with lithium benzoate in 1% amount in molar ratio, and is subjected to an ion exchange treatment for 3 hours at 250° C. in a furnace to form, as shown in FIG. 14(e), a proton exchange layer 70 in the Ti diffusion layer 67. The depth of proton exchange layer is smaller in the high Ti concentration area 66 than in the end parts of the light guide as shown in FIG. 14(e), because the proton injection is suppressed by the higher concentration of thermally diffused titanium in said area. The obtained sample is subjected to ultrasonic washing with ethanol and dried by nitrogen gas blowing.

Then said substrate is subjected to an annealing treatment for 4 hours at 350° C. in a furnace, in a moist oxygen atmosphere of a flow rate of 1.0 liter/min. obtained by passing oxygen through heated water.

Figure 14F:
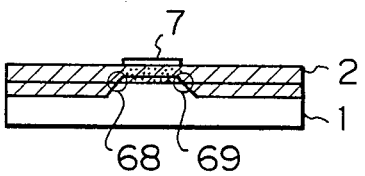

In this manner there is obtained a light guide 2 which has, as illustrated in FIG. 14(f), a thinner proton exchange layer and a higher Ti concentration in the area where the optical functional part is to be formed, and a progressively thicker proton exchange layer and a lower Ti concentration toward the ends of the light guide.

Finally the optical functional part is completed by forming comb electrodes 7 through an ordinary photolithographic process on the light guide.

Because of said annealing treatment, the proton distribution in boundaries 68, 69 of said functional part shows a gradual change, and a low propagation loss in said boundaries has been experimentally confirmed.

Figure 15:
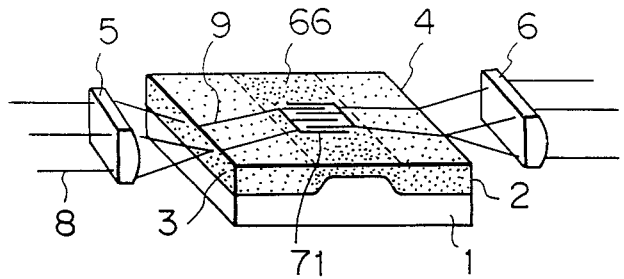
FIGS. 15 to 18 are perspective views respectively showing 8th to 11th embodiments of the present invention.

FIG. 15 is a schematic view of an 8th embodiment in which the element of FIG. 13 is used as a light deflector utilizing an electro-optical effect, wherein the same components as those in FIG. 13 are represented by same numbers and will not be explained in further detail. Comb electrodes 71 are provided for achieving the electro-optical effect.

Also in the present embodiment, a high Ti concentration area 66 is formed in the area of phase grating generated by the electro-optical effect, and the depth of proton injection is smaller in said area, whereby the distribution of intensity of the guided light 9 is concentrated in the vicinity of the surface of the substrate in said area. Consequently a diffraction efficiency as high at 90% can be achieved with a low voltage of 5 V applied to said comb electrodes 71.

Also the connection efficiency at the end faces of the light guide is as high as 80%. The element of the present embodiment can be prepared through a process similar to that explained in relation to FIG. 14.

Figure 16:
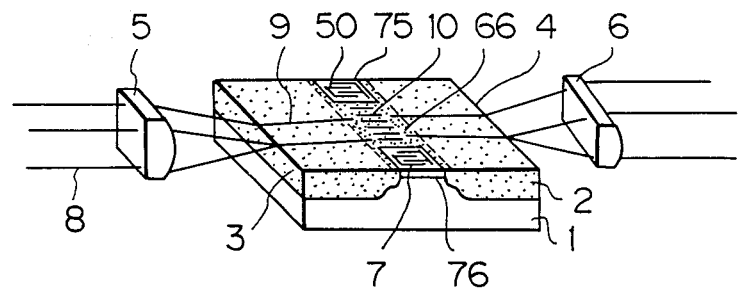

FIG. 16 is a perspective view of a 9th embodiment of the present invention in which proton injection-free areas 75, 76 are formed in a part of the substrate in the foregoing 7th embodiment and comb electrodes 7, 50 are formed on said areas. In FIG. 16, the same components as those in FIG. 13 are represented by same numbers and will not be explained in further detail. As in said 7th embodiment, the present embodiment achieves a high connection efficiency and a high diffraction efficiency at the same time. Also an efficient modulation or deflection of the guided light is possible with a low electric power, since the absence of proton injection in the area of comb electrodes prevents the deterioration of the piezoelectric and electro-optical properties in said area.

The thin film optical element shown in FIG. 16 can be prepared through a process explained in relation to FIG. 14, except that said proton exchange-free areas are formed in a part of the substrate surface by forming a mask in said areas prior to the proton exchange treatment.

Figure 17:
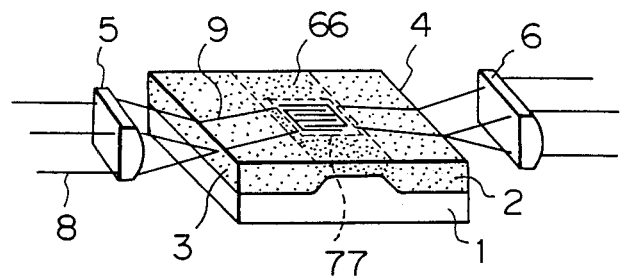

FIG. 17 is a schematic view of a 10th embodiment in which the element shown in FIG. 16 is used as a light deflector utilizing an electro-optical effect, wherein the same components as those in FIG. 16 are represented by same numbers and will not be explained in further detail. In the present embodiment, proton injection is absent under the comb electrodes 77 for electro-optical effect. The element of the present embodiment can also be easily prepared by a process similar to the one explained in FIG. 14, in which the comb electrodes are used as a mask for proton exchange.

Though the foregoing embodiments have different depths of ion injection between the optical functional part and the optical connector parts, similar effects can also be obtained by varying the concentration of ion injection as will be explained in the following.

Figure 18:
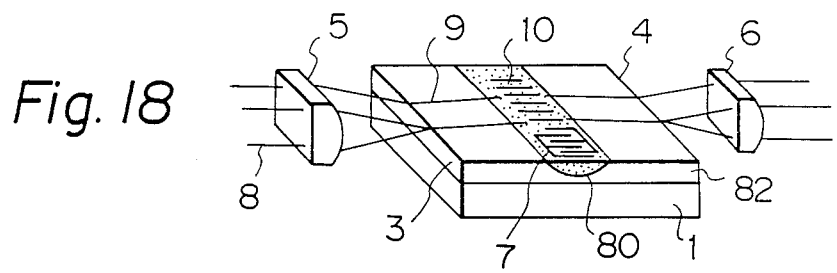

FIG. 18 is a perspective view showing an 11th embodiment of the thin film optical element of the present invention utilizing an acousto-optical effect. In FIG. 18 there are shown an x- or y-type crystalline LiNbO$_3$ substrate 1; a light guide 82 formed by proton exchange; polished end faces 3, 4 of the light guide; cylindrical lenses 5, 6; comb electrodes 7; and a high proton concentration layer 80 with a higher proton concentration than in the light guide 82.

A parallel light beam 8 of a wavelength of 6328 Å from a He-Ne laser is connected to the light guide by focusing, in the direction of thickness thereof by the cylindrical lens 5, onto the polished end face 3 of the light guide. The light 9 guided from said end face is diffracted by a surface elastic wave 10 generated by a high frequency power supplied to the comb electrodes 7, and the diffracted light emerges from the end face 4 and is converted into a parallel beam by the cylindrical lens 6. A connection efficiency as high as 80% is achievable since the width of focused beam, in the direction of focusing, on the end face 3 approximately matches the width of the guided light.

The light guide 82 is provided with a high proton concentration layer 80 in the area of interaction between the surface elastic wave 10 and the guided light 9, and the higher proton concentration in the vicinity of the surface attracts the distribution of the guided light toward said surface in said area, thus achieving a high diffraction efficiency for the guided light by the surface elastic wave.

FIGS. 19(a)–19(f) are schematic cross sectional views showing a method for producing the thin film optical element as shown in FIG. 18.

Figure 19A:
FIGS. 19(a)-19(f) are schematic cross sectional views showing an example of the preparation process of the 11th embodiment.
Figure 19B:

At first, as shown in FIG. 19(a), a y- or x-surface of a y- or x-type crystalline $LiNbO_3$ substrate 1 is polished to a flatness of several Newton rings or less, then subjected to ordinary ultrasonic washing with acetone and then with purified water, and dried by nitrogen gas blowing. Subsequently a titanium film of a thickness of 200 Å is deposited on said surface by electron beam evaporation, and subjected to thermal diffusion for 2.5 hours at 965° C. in an oxygen atmosphere to form a Ti thermal diffusion layer 11 as shown in FIG. 19(b). Other metals such as V, Ni, Au, Ag, Co, Nb or Ge may also be employed for said thermal diffusion.

Figure 19C:
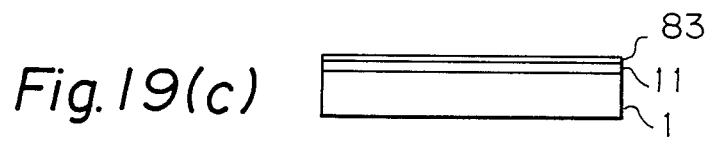
Figure 19D:
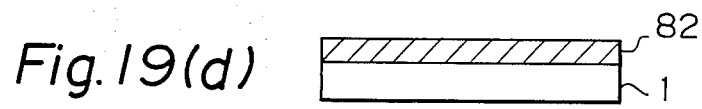

Then, said substrate with the Ti diffusion layer shown in FIG. 19(b) is placed in an alumina crucible containing benzoic acid added with lithium benzoate in 2% amount in molar ratio, and is subjected to an ion exchange treatment for 5 hours in a furnace of 250° C. to form a proton exchange layer 83 in the Ti diffusion layer 11 as shown in FIG. 19(c). The obtained sample is subjected to ultrasonic washing with ethanol, and dried by nitrogen gas blowing.

Subsequently said substrate is subjected to an annealing treatment for 4 hours in a furnace of 350° C., in a moist oxygen atmosphere of a flow rate of 1.0 liter/min. obtained by passing oxygen through heated water. In this manner there is formed the light guide 82 with proton diffusion toward the substrate.

Figure 19E:
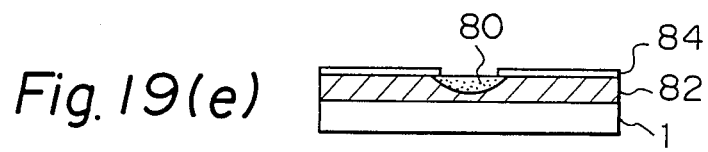

Then, as shown in FIG. 19(e), a chromium film 84, having an aperture only in the optical functional part for interaction between the surface elastic wave and the guided light, is formed by evaporation on the light guide 82, as a mask for succeeding proton exchange treatment. The substrate bearing said mask is subjected to a proton exchange treatment for 1 hour at 250° C., with benzoic acid added with lithium benzoate in 5% amount in molar ratio, to obtain a high proton concentration layer 80 in the vicinity of the surface in said functional part, by means of the proton exchange through said aperture. After said proton exchange, the substrate is again subjected to ultrasonic washing with ethanol and dried by nitrogen gas blowing.

Figure 19F:
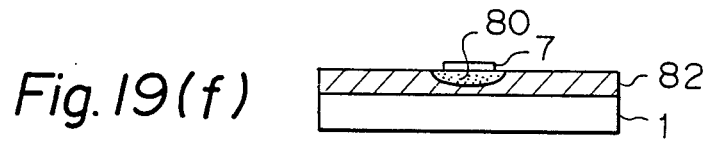

Finally the mask 84 is removed by etching, and comb electrodes 7 are formed, as shown in FIG. 19(f), through an ordinary photolithographic process.

The annealing treatment is to be conducted prior to the formation of the comb electrodes, in case there is a large difference in the refractive index of the light guide 82 and the high proton concentration layer 80 to result in a significant loss in the guided light at the boundary therebetween.

The light guide in the above-described embodiment is formed by titanium diffusion and thermal proton diffusion, but Ti diffusion is not indispensable. Instead, the light guide may be formed by injection or thermal diffusion of protons alone, or by external diffusion of LiO combined with injection or thermal diffusion of protons.

Figure 20:
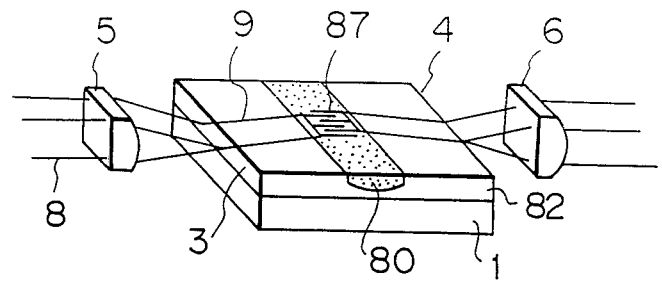
FIGS. 20 to 23 are perspective views respectively showing 12th to 15th embodiments of the present invention.

FIG. 20 is a schematic view of a 12th embodiment in which the element of FIG. 18 is used as a light deflector utilizing an electro-optical effect. In FIG. 20, the same components as those in FIG. 18 are represented by same numbers and will not be explained further.

A laser beam 8 is connected to the light guide 82, by focusing, in the direction of thickness thereof by a cylindrical lens 5, onto a polished end face 3 of the light guide. The light 9 guided from said end face is diffracted by a phase grating generated by a voltage applied to comb electrodes 87 for electro-optical effect, then emerges from another end face 4 of the light guide and is converted into a parallel beam by the cylindrical lens 6. The comb electrodes employed have 350 pairs of electrodes, of a width and a spacing of 2.2 $\mu m$ and an interlocking width of 3.8 mm.

Also in the present embodiment, the presence of the high proton concentration layer 80 in the area of the phase grating by the electro-optical effect attracts the distribution of the guided light 9 toward the surface in said area. Consequently a diffraction efficiency as high as 90% can be achieved by a low voltage of 5 V applied to said comb electrodes 87.

Also the connection efficiency at the end faces of the light guide is as high as 80%. The element of the present embodiment can be prepared by a process similar to that of the 11th embodiment.

Figure 21:
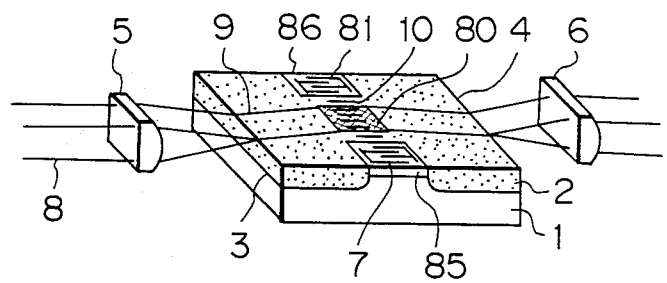

FIG. 21 is a perspective view of a 13th embodiment of the present invention in which areas 85, 86 free from proton injection are formed in a part of the substrate 1 in the foregoing 11th embodiment and comb electrodes 7, 81 are formed on said areas. In FIG. 21, the same components as those in FIG. 18 are represented by same numbers and will not be explained further. As in said 11th embodiment, the present embodiment achieves a high connection efficiency and a high diffraction efficiency at the same time. Also an efficient modulation or deflection of the guided light is possible with a low electric power, since the absence of proton injection in the area of comb electrodes prevents the deterioration of the piezoelectric and electro-optical properties in said area.

The thin film optical element shown in FIG. 21 can be prepared through a process explained in relation to FIG. 19, except that said proton exchange-free areas are formed in a part of the substrate surface for the comb electrodes, by forming a mask in said areas prior to the proton exchange treatment.

Figure 22:
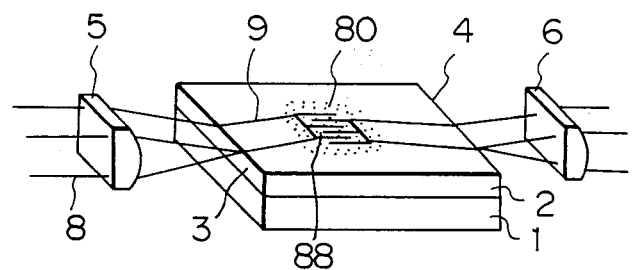

FIG. 22 is a schematic view of a 14th embodiment in which the element shown in FIG. 21 is used as a light deflector utilizing an electro-optical effect. In FIG. 22, the same components as those in FIG. 21 are represented by same number and will not be explained further. In the present embodiment, proton injection is absent under the comb electrodes 88 for electro-optical effect. The element of the present embodiment can also be easily prepared by a process similar to the one explained in FIG. 19, in which the comb electrodes are used as a mask for proton exchange.

In addition to the foregoing embodiments in which the depth or concentration of ion injection is different between the optical functional part and the optical connector parts, similar effects can be obtained also by rendering the ion concentration, along the direction of thickness of the substrate, higher at the interior than at the surface of the substrate, as will be explained in the following.

Figure 23:
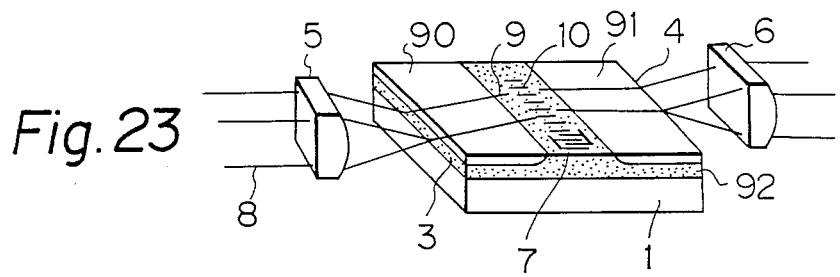

FIG. 23 is a perspective view showing a 15th embodiment of the thin film optical element of the present invention utilizing an acousto-optical effect, wherein shown are an x- or y-type crystalline $LiNbO_3$ substrate 1; a light guide 92 formed by proton exchange; polished end faces 3, 4 of said light guide; cylindrical lenses 5, 6;

comb electrodes 7; and low refractive index layers 90, 91 formed by proton diffusion toward the exterior.

A parallel light beam 8 of a wavelength of 6328 Å from a He-Ne laser is connected to the light guide by focusing, in the direction of thickness thereof by the cylindrical lens 5, onto a polished end face 3 of the light guide. The light 9 guided from said end face is diffracted by a surface elastic wave 10 generated by a high frequency power applied to the comb electrodes 7, and the diffracted light emerges from another end face 4 and is converted into a parallel beam by the cylindrical lens 6. In this case the width of the focused beam, in the direction of focusing by the cylindrical lens 5, on the end face 3 approximately matches the width of the guided light, and the light guide 92 is embedded under the layers 90 and 91 of low refractive index in the vicinity of said end faces. For these reasons the intensity distribution of the guided light is very close to that of the input or output light to achieve a high connection efficiency of 85%. The light guided from the end face is pulled up toward the surface of the substrate as it proceeds toward the optical functional part for interaction with the surface elastic wave, thus achieving a high diffraction efficiency.

FIGS. 24(a)-24(f) are schematic cross sectional views showing a method for producing the thin film optical element as shown in FIG. 23.

Figure 24A:
FIGS. 24(a)-24(f) are schematic cross sectional views showing an example of the preparation process of the 15th embodiment.
Figure 24B:
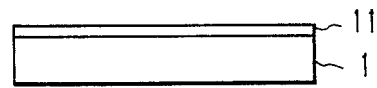

At first, as shown in FIG. 24(a), a y- or x-surface of a y- or x-type crystalline $LiNbO_3$ substrate 1 is polished to a flatness of several Newton rings or less, then subjected to ordinary ultrasonic washing with acetone and then with purified water, and dried by nitrogen gas blowing. Then a titanium film of a thickness of 200 Å is deposited on said surface by electron beam evaporation, and is subjected to thermal diffusion for 2.5 hours at 965° C. in an oxygen atmosphere to obtain a Ti thermal diffusion layer 11 as shown in FIG. 24(b). Another metal such as V, Ni, Au, Ag, Co, Nb or Ge may also be employed for said thermal diffusion.

Figure 24C:
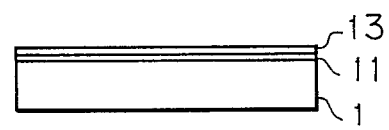

Then the $LiNbO_3$ substrate containing the Ti diffusion layer as shown in FIG. 24(b) is placed in an alumina crucible containing benzoic acid added with lithium benzoate in 1% amount in molar ratio, and is subjected to an ion exchange treatment for 1 hour in a furnace of 250° C. to form a proton exchange layer 13 in the Ti diffusion layer 11 as shown in FIG. 24(c). The sample is subjected to ultrasonic washing with ethanol, and dried by nitrogen gas blowing.

Figure 24D:

The substrate after proton exchange is subjected to an annealing treatment for 4 hours in a furnace of 350° C., in a moist oxygen atmosphere of a flow rate of 1.0 liter/min. obtained by passing oxygen through heated water, thereby forming the light guide 92 with proton diffusion into the substrate as shown in FIG. 24(d).

Figure 24E:
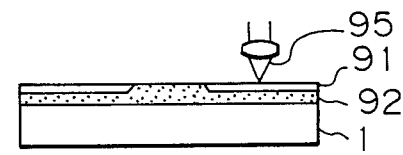

Then, as shown in FIG. 24(e), the surface of the light guide 92 is subjected to laser annealing with a focused beam 95 of a wavelength of 10.6 $\mu$m from a $CO_2$ laser, except the area for interaction between the surface elastic wave and the guided light. Said beam of 10.6 $\mu$m is absorbed by the $LiNbO_3$ crystal to expel the protons of the surface area into the air, thus reducing the refractive index in the vicinity of the surface to form the layer 91 of the low refractive index.

Figure 24F:
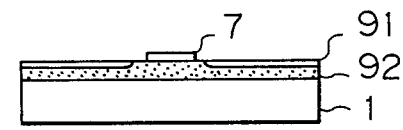

Finally the comb electrodes 7 are formed, as shown in FIG. 24(f), by an ordinary photolithographic process.

In the above-described method, the light guide is formed by separate treatments of thermal annealing shown in FIG. 24(d) and laser annealing, but the light guide may also be formed by laser annealing only if the wavelength of the laser beam used for laser annealing is suitably selected to meet the absorption coefficient of the $LiNbO_3$ crystal.

The light guide in the above-described embodiment is formed by titanium diffusion and thermal proton diffusion, but the Ti diffusion is not indispensable. Instead the light guide may also be formed by injection or thermal diffusion of protons alone, or by external diffusion of LiO combined with injection or thermal diffusion of protons.

Figure 25:
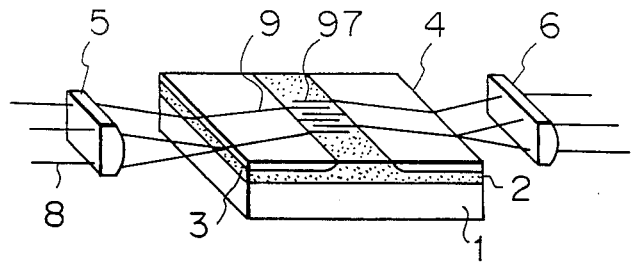
FIGS. 25 to 28 are perspective views respectively showing 16th to 19th embodiments of the present invention.

FIG. 25 is a schematic view of a 16th embodiment, in which the element shown in FIG. 23 is used as a light deflector utilizing an electro-optical effect. In FIG. 25, the same components as those in FIG. 23 are represented by same numbers and will not be explained further.

A laser light beam 8 is connected to the light guide by focusing, in the direction of thickness thereof by a cylindrical lens 5, onto a polished end face 3 of the light guide 2. The light 9 guided from said end face is diffracted by a phase grating generated by a voltage applied to comb electrodes 97 for electro-optical effect, then emerges from another end face 4 of the light guide and is converted into a parallel beam by a cylindrical lens 6. The comb electrodes employed in the present embodiment have 350 pairs of electrodes, of a width and a spacing of 2.2 $\mu$m and of an interlocking width of 3.8 mm. A diffraction efficiency as high as 90% is achieved by a low voltage of 5 V applied to said comb electrodes. Also the connection efficiency at the optical connector parts is as high as 85%.

Figure 26:
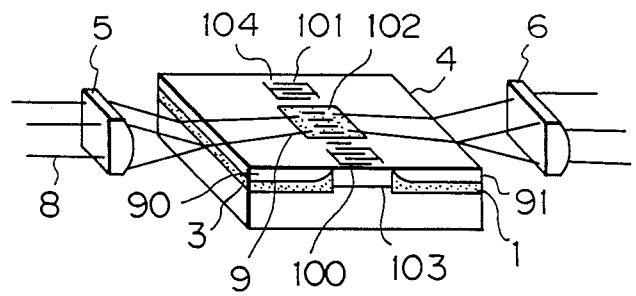

FIG. 26 is a perspective view of a 17th embodiment of the present invention in which areas 103, 104 free from proton injection are formed in a part of the substrate in the foregoing 15th embodiment and comb electrodes 100, 101 are formed on said areas. In FIG. 26, the same components as those in FIG. 23 are represented by same numbers and will not be explained further. As in said 15th embodiment, the present embodiment achieves a high connection efficiency and a high diffraction efficiency at the same time. Also an efficient modulation or deflection of the guided light is possible with a low electric power, since the absence of proton injection in the areas of comb electrodes prevents the deterioration of the piezoelectric and electro-optical properties in said areas.

The thin film optical element as shown in FIG. 26 can be prepared through a process explained in relation to FIG. 24, except that said proton exchange-free areas are formed in a part of the substrate surface for the comb electrodes, by forming a mask in said areas prior to the proton exchange treatment.

Figure 27:
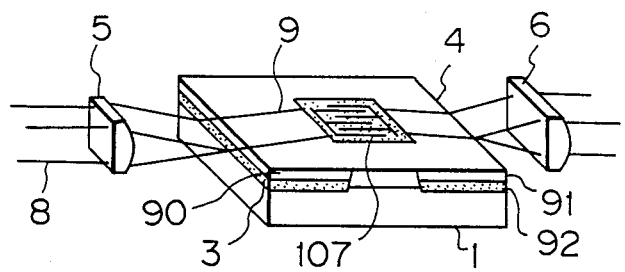

FIG. 27 is a schematic view of an 18th embodiment in which the element shown in FIG. 26 is used as a light deflector utilizing an electro-optical effect, wherein the same components as those in FIG. 26 are represented by same numbers and will not be explained further. In the present embodiment proton injection is absent under the comb electrodes 107 for electro-optical effect. The element of the present embodiment can also be easily prepared by a process similar to the one explained in FIG. 24, in which the comb electrodes are used as a mask for proton exchange.

In addition to the foregoing embodiments in which the depth or concentration of ion injection is made different between the optical functional part and the optical connector parts or the ion concentration along the thickness of direction of the substrate is made higher in the interior than at the surface of the substrate, a further efficient optical element can be realized by the combination of these factors as will be explained in the following.

Figure 28:
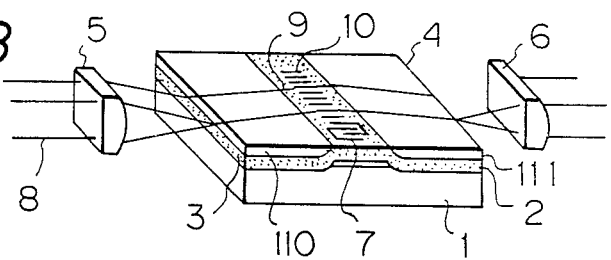

FIG. 28 is a perspective view of a 19th embodiment of the optical element of the present invention utilizing an acousto-optical effect, which is different from the first embodiment shown in FIG. 1, in that the ion concentration at the optical connector parts is made higher in the interior than at the surface of the substrate. In FIG. 28, the same components as those in FIG. 1 are represented by same numbers and will not be explained further. The present embodiment shows a larger depth of ion injection in the optical connector parts than in the optical functional part, and is provided, on the surface of the light guide, with layers 110, 111 of a low refractive index obtained by proton difusion to the exterior. Consequently the energy distribution of the guided light in the optical connector parts is very close to that of the externally entered light, thus achieving a high connection efficiency. On the other hand, in the optical functional part, the energy distribution of the guided light is concentrated to the vicinity of surface of the substrate to achieve a high diffraction efficiency.

The element of said 19th embodiment can be prepared in a similar manner as the element of the first embodiment, by adding a laser annealing step shown in FIG. 24 to the method explained in relation to FIG. 2. Now reference is made to FIGS. 29(a)–29(g) for briefly explaining the method of preparation, in which the details of proton exchange etc. are identical with those of the method shown in FIG. 2.

Figure 29A:
FIGS. 29(a)-29(g) are schematic cross sectional views showing an example of the preparation process of the 19th embodiment.
Figure 29B:
Figure 29C:

At first a crystalline LiNbO$_3$ substrate 1 as shown in FIG. 29(a) is subjected to the formation of a Ti thermal diffusion layer 11 as shown in FIG. 29(b), and a proton exchange layer 13 is formed only in the optical functional part through a mask composed of a chromium film as shown in FIG. 29(c).

Figure 29D:
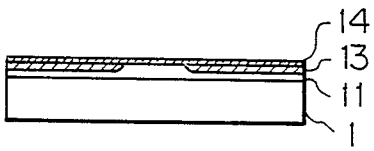
Figure 29E:
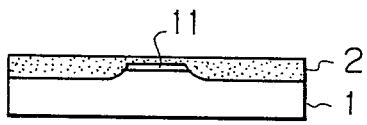
Figure 29F:
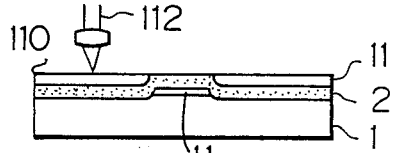

Then, after the elimination of the chromium film 12, a proton exchange layer 14 is again formed on the entire surface of the substrate as shown in FIG. 29(d). The obtained sample is subjected to an annealing treatment to obtain a light guide 2 having a larger depth of ion injection in the optical connector portions than in the optical functional part, as shown in FIG. 29(e). Then a laser annealing treatment with a CO$_2$ laser 112 is applied to the optical connector parts of the light guide 2 as shown in FIG. 29(f) to form the layers 110, 111 by proton diffusion to the exterior.

Figure 29G:
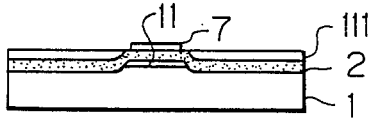

Finally the comb electrodes are formed on the functional part as shown in FIG. 29(g).

The optical element shown in FIG. 28 can also be prepared by a method shown in FIGS. 30(a)–30(g) which is a variation of the method shown in FIG. 3.

Figure 30A:
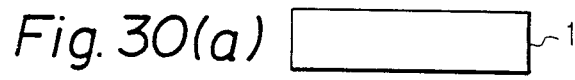
FIGS. 30(a)-30(g) are schematic cross sectional views showing another example of the preparation process of the 19th embodiment.
Figure 30B:
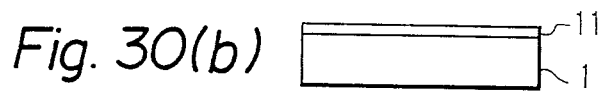
Figure 30C:
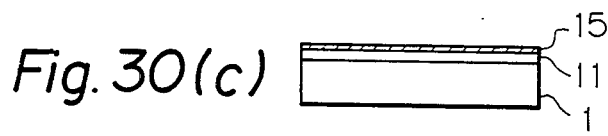
Figure 30D:
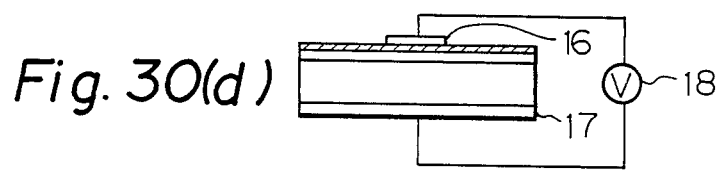
Figure 30E:
Figure 30F:
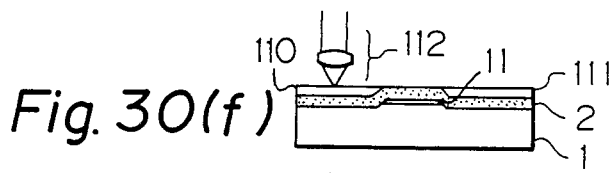

At first a crystalline LiNbO$_3$ substrate 1 as shown in FIG. 30(a) is subjected to the formation of a Ti thermal duffusion layer 11 as shown in FIG. 30(b), and a proton exchange layer 15 as shown in FIG. 30(c) is formed further. Then a gold film 16 is formed by evaporation only in the optical functional part, and another gold film 17 is formed also on the rear surface of the substrate as shown in FIG. 30(d). Then an annealing treatment is conducted, simultaneously with the application of a voltage, to said gold films 16, 17 from a voltage source 18, of a polarity for suppressing the thermal diffusion of protons into the substrate, thereby obtaining a light guide 2 having a larger depth of ion injection in the optical connector parts than in the optical functional part. Then a laser annealing treatment with a CO$_2$ laser 112 is applied to the optical connector parts of the light guide 2 as shown in FIG. 30(f) to form the layers 110, 111 by proton diffusion to the exterior.

Figure 30G:
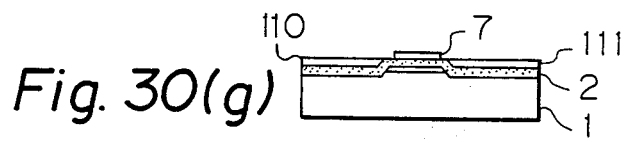

Finally the comb electrodes are formed on the functional part as shown in FIG. 30(g).

Figure 31:
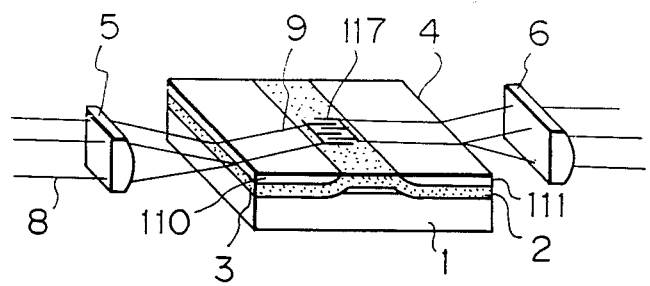
FIGS. 31 to 34 are perspective views respectively showing 20th to 23rd embodiments of the present invention.

FIG. 31 is a perspective view of a 20th embodiment in which the element shown in FIG. 28 is used as a light deflector utilizing an electro-optical effect. The present embodiment is identical with the 19th embodiment except that the comb electrodes thereof are replaced by comb electrodes 117 for electro-optical effect, wherein the same components as those in FIG. 28 are represented by same numbers and will not be explained further. The element of present embodiment can also be easily prepared by a method explained in FIG. 30.

Figure 32:
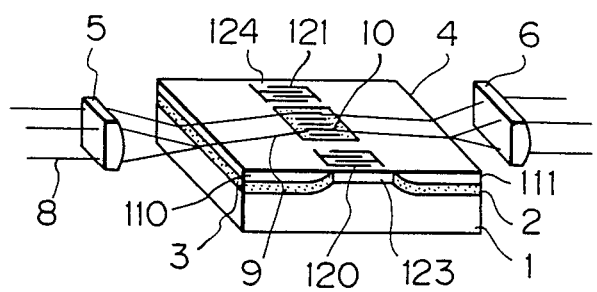

FIG. 32 is a perspective view of a 21st embodiment of the present invention in which areas 123, 124 free from proton injection are formed in a part of the substrate in the foregoing 19th embodiment and comb electrodes 120, 121 are formed on said areas. In FIG. 32, the same components as those in FIG. 28 are represented by same numbers and will not be explained further. As in said 19th embodiment, the present embodiment achieves a high connection efficiency and a high diffraction efficiency at the same time. Also an efficient modulation or deflection of the guided light is possible with a low electric power, since the absence of proton injection in the areas of comb electrodes prevents the deterioration of the piezoelectric and electro-optical properties in said areas.

The thin film optical element as shown in FIG. 32 can be prepared through a method explained in relation to FIG. 29 or FIG. 30, except that said proton exchange-free areas are formed in a part of the substrate surface for the comb electrodes, by forming a mask in said areas prior to the proton exchange treatment.

Figure 33:
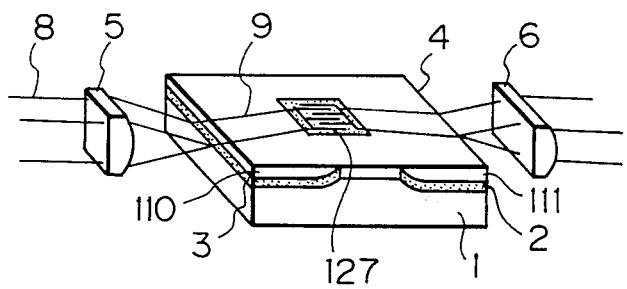

FIG. 33 is a schematic view of a 22nd embodiment in which the element shown in FIG. 32 is used as a light deflector utilizing an electro-optical effect. In FIG. 33, the same components as those in FIG. 32 are represented by same numbers and will not be explained further. In the present embodiment, proton injection is absent under the comb electrodes 127 for electro-optical effect. The element of the present embodiment can also be easily prepared by a process similar to the one explained in FIG. 29 or FIG. 30, in which the comb electrodes are used as a mask for proton exchange.

Figures 34, 35A, 35B, 35C, 35D, 35E, 35F, 35G, 35H:
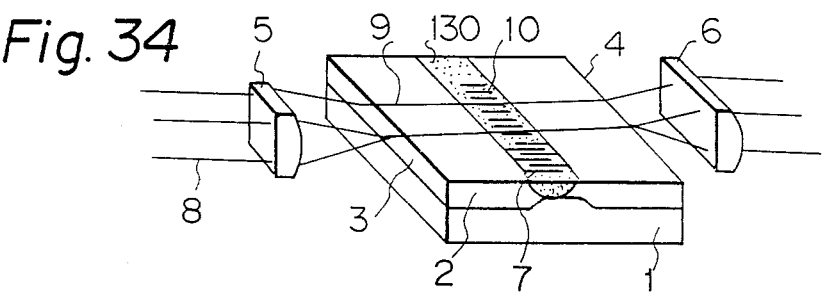
FIGS. 35(a)-35(h) are schematic cross sectional views showing an example of the preparation process of the 23rd embodiment.

FIG. 34 is a perspective view of a 23rd embodiment of the present invention utilizing an acousto-optical effect, which is different from the first embodiment shown in FIG. 1 in that the ion concentration in the optical functional part is made higher than that in the optical connector parts. In FIG. 34, the same components as those in FIG. 1 are represented by same numbers and will not be explained further. The element of the present embodiment has a larger depth of ion injection in the optical connector parts than in the functional part, and is provided with a layer 130 of a high ion concentration in said functional part. Consequently the energy distribution of the guided light in the optical connector parts is very close to that of the externally entered light, thus achieving a high connection efficiency. On the other hand, in the optical functional part, the energy distribution of the guided light is concentrated to the vicinity of the surface of the substrate to achieve a high diffraction efficiency.

The element of said 23rd embodiment can be prepared in a similar manner as the element of the first embodiment, by adding a step of partial ion injection shown in FIG. 18 to the method described in relation to FIG. 2. Now reference is made to FIGS. 35(a)–35(h) for briefly explaining the method of preparation, in which the details of proton exchange etc. are identical with those of the method shown in FIG. 2.

At first a crystalline LiNbO$_3$ substrate 1 as shown in FIG. 35(a) is subjected to the formation of a Ti thermal diffusion layer 11 as shown in FIG. 35(b), and a proton exchange layer 13 is formed only in the optical functional part through a mask composed of a chromium film as shown in FIG. 35(c).

Then, after the elimination of the chromium film 12, a proton exchange layer 14 is again formed on the entire surface of the substrate as shown in FIG. 35(d). The obtained sample is subjected to an annealing treatment to obtain a light guide 2 having a larger depth of ion injection in the optical connector portions than in the optical functional part, as shown in FIG. 35(e). Subsequently a proton exchange treatment is effected through a mask composed of a chromium film 84 having an aperture only in the optical functional part to form a high proton concentration layer 130 as shown in FIG. 35(g).

Finally the comb electrodes 7 are formed on the functional part as shown in FIG. 35(h).

Figure 36:
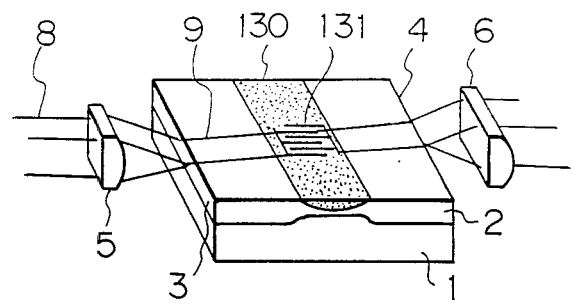
FIGS. 36 to 39 are perspective views respectively showing 24th to 27th embodiments of the present invention.

FIG. 36 is a perspective view of a 24th embodiment in which the element shown in FIG. 34 is used as a light deflector utilizing an electro-optical effect. The present embodiment is identical with the 23rd embodiment except that the comb electrodes thereof are replaced by comb electrodes 131 for electro-optical effect, wherein the same components as those in FIG. 34 are represented by same numbers and will not be explained further. The element of the present embodiment can also be easily prepared by a method explained in FIG. 35.

Figure 37:
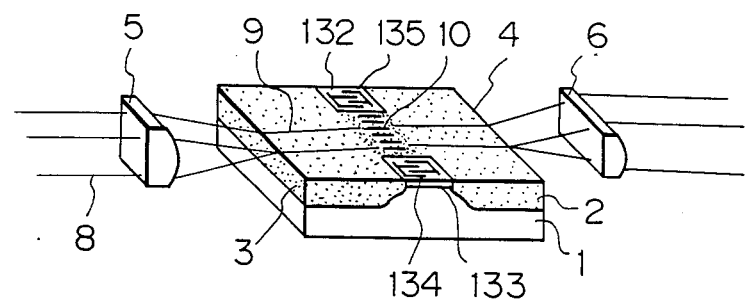

FIG. 37 is a perspective view of a 25th embodiment of the present invention in which areas 133, 132 free from proton injection are formed in a part of the substrate in the foregoing 23rd embodiment and comb electrodes 134, 135 are formed on said areas. In FIG. 37, the same components as those in FIG. 34 are represented by same numbers and will not be explained further. Like said 23rd embodiment, the present embodiment achieves a high connection efficiency and a high diffraction efficiency at the same time. Also an efficient modulation or deflection of the guided light is possible with a low electric power, since the absence of proton injection in the areas of comb electrodes prevents the deterioration of the piezoelectric and electro-optical properties in said areas.

The thin film optical element as shown in FIG. 37 can be prepared through a method explained in relation to FIG. 35, except that said proton exchange-free areas are formed in a part of the substrate surface for the comb electrodes, by forming a mask in said areas prior to the proton exchange treatment.

Figure 38:
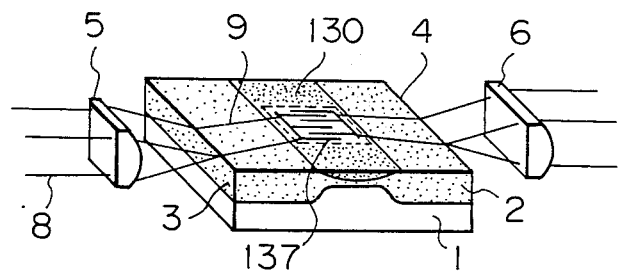

FIG. 38 is a schematic view of a 26th embodiment in which the element shown in FIG. 37 is used as a light deflector utilizing an electro-optical effect, wherein the same components as those in FIG. 37 are represented by same numbers and will not be explained further. In the present embodiment proton injection is absent under the comb electrodes 137 for electro-optical effect. The element of the present embodiment can also be easily prepared by a process similar to the one explained in FIG. 35, in which the comb electrodes are used as a mask for proton exchange.

Figure 39:
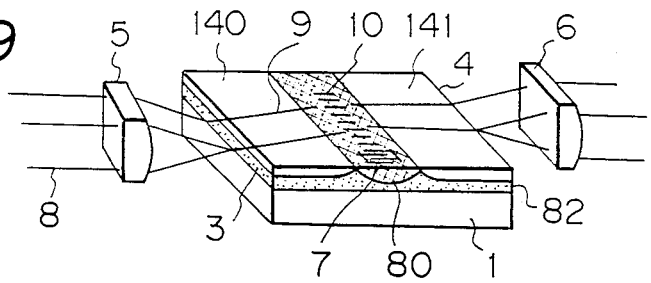

FIG. 39 is a perspective view of a 27th embodiment of the present invention utilizing an acousto-optical effect, which is different from the 11th embodiment shown in FIG. 18, in that the ion concentration along the direction of thickness of the substrate in the optical connector parts is made higher in the interior than at the surface of the substrate. In FIG. 39, the same components as those in FIG. 18 are represented by same numbers and will not be explained further. The element of the present embodiment has a higher ion concentration in the optical functional part than in the optical connector parts by the presence of a high proton concentration layer 80, and is provided, on the light guide, with layers 140, 141 of a lower refractive index formed by proton diffusion to the exterior. Consequently the energy distribution of the guided light in the optical connector parts is very close to that of the externally entered light, thus achieving a high connection efficiency. On the other hand, in the optical functional part, the energy distribution of the guided light is concentrated to the vicinity of the surface of the substrate to achieve a high diffraction efficiency.

The element of said 27th embodiment can be prepared in a similar manner as the element of the first embodiment, by adding a laser annealing step shown in FIG. 24 to the method explained in relation to FIG. 19, as will be briefly explained in FIGS. 40(a)–40(g), in which the details of proton exchange etc. are identical with those of the method shown in FIG. 19.

Figure 40A:
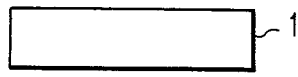
FIGS. 40(a)-40(g) are schematic cross sectional views showing an example of the preparation process of the 27th embodiment.
Figure 40B:
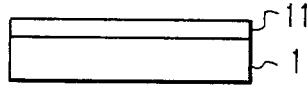
Figure 40C:
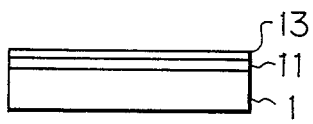
Figure 40D:
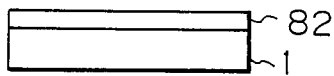

At first a crystalline LiNbO$_3$ substrate 1 as shown in FIG. 40(a) is subjected to the formation of a Ti termal diffusion layer 11 as shown in FIG. 40(b), and a proton exchange layer 13 is then formed as shown in FIG. 40(c). The obtained sample is annealed to form a light guide 82 as shown in FIG. 40(d).

Figure 40E:
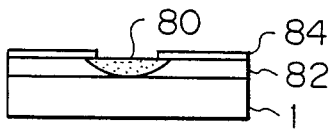

Subsequently a proton exchange treatment is effected through a mask consisting of a chromium film 84 having an aperture in the optical functional part to form the high proton concentration layer 80 as shown in FIG. 40(e).

Figure 40F:
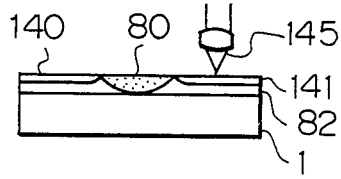

Then a laser annealing treatment with a CO$_2$ laser 145 is applied to the optical connector parts of the light guide 2 as shown in FIG. 40(f) to form the layers 140 and 141 by proton diffusion to the exterior.

Figure 40G:
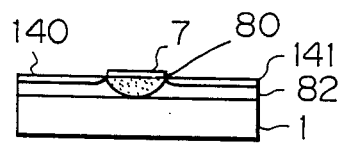

Finally the comb electrodes 7 are formed on the functional part as shown in FIG. 40(g).

Figure 41:
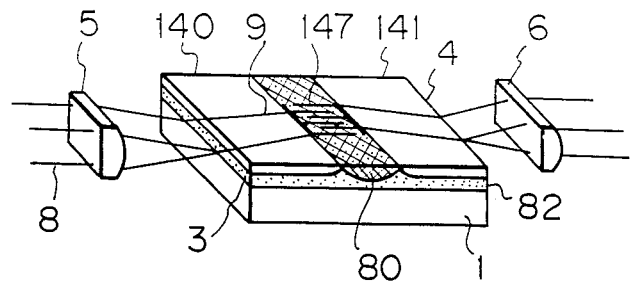
FIGS. 41 to 44 are perspective views respectively showing 28th to 31st embodiments of the present invention.

FIG. 41 is a perspective view of a 28th embodiment in which the element shown in FIG. 39 is used as a light deflector utilizing an electro-optical effect. The present embodiment is identical with the 27th embodiment except that the comb electrodes thereof are replaced by comb electrodes 147 for electro-optical effect. In FIG. 41, the same components as those in FIG. 39 are represented by same numbers and will not be explained further. The element of the present embodiment can also be easily prepared by a method explained in FIG. 40.

Figure 42:
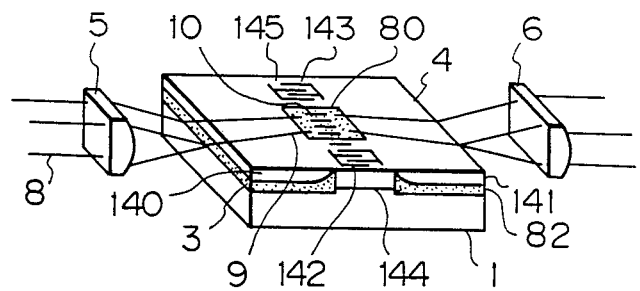

FIG. 42 is a perspective view of a 29th embodiment of the present invention in which areas 144, 145 free form proton injection are formed in a part of the substrate of the foregoing 27th embodiment and comb electrodes 142, 143 are formed on said areas. In FIG. 42, same components as those in FIG. 39 are represented by same numbers and will not be explained further. Like the 27th embodiment, the present embodiment achieves a high connection efficiency and a high diffraction efficiency at the same time. Also an efficient modulation or deflection of the guided light is possible with a low electric power, since the absence of proton injection in the areas of comb electrodes prevents the deterioration of the piezoelectric and electro-optical properties in said areas.

The thin film optical element as shown in FIG. 42 can be prepared through a method explained in relation to FIG. 40, except that said proton exchange-free areas are formed in a part of the substrate for the comb electrodes, by forming a mask in said areas prior to the proton exchange treatment.

Figure 43:
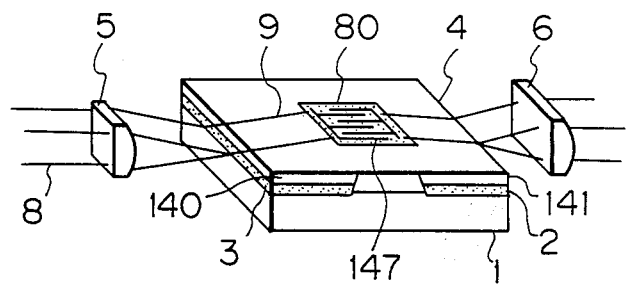

FIG. 43 is a schematic view of a 30th embodiment in which the element shown in FIG. 42 is used as a light deflector utilizing an electro-optical effect. In FIG. 43, the same components as those in FIG. 42 are represented by same numbers and will not be explained further. In the present embodiment, proton injection is absent under the comb electrodes 147 for electro-optical effect. The element of the present embodiment can also be easily prepared by a method similar to the one explained in FIG. 40, in which the comb electrodes are used as a mask for proton exchange.

Figure 44:
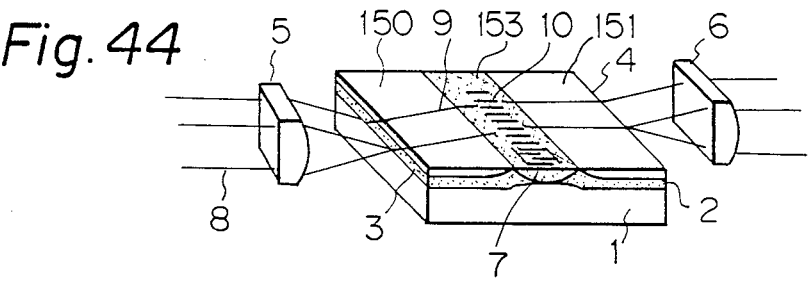

FIG. 44 is a perspective view of a 31st embodiment of the present invention utilizing an acousto-optical effect, which is different from the 7th embodiment shown in FIG. 13 in that the ion concentration in the direction of thickness of the substrate in the optical connector parts is made higher in the interior than at the surface of the substrate. In FIG. 44, the same components as those in FIG. 13 are represented by same numbers and will not be explained further. The element of the present embodiment has larger depth of ion injection in the optical connector parts than in the optical functional part, and is provided, on the surface of the light guide 2, with layers 150, 151 of a low refractive index formed by proton diffusion to the exterior, and with a high Ti concentration area 153 in the optical functional part. Consequently the energy distribution of the guided light in the optical connector parts is very close to that of the externally entered light, thus achieving a high connection efficiency. On the other hand, in the optical functional part, the energy distribution of the guided light is concentrated to the vicinity of the surface of the substrate, thus achieving a high diffraction efficiency.

The element of said 31st embodiment can be prepared in a similar manner as the element of the first element, by adding a laser annealing step shown in FIG. 24 to the method explained in relation to FIG. 14, as will be briefly explained in FIGS. 45(a)–45(h), in which the details of proton exchange etc. are identical with those of the method shown in FIG. 14.

Figure 45A:
FIGS. 45(a)-45(h) are schematic cross sectional views showing an example of the preparation process of the 31st embodiment.
Figure 45B:
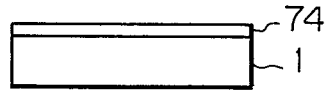
Figure 45C:
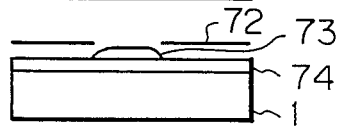
Figure 45D:
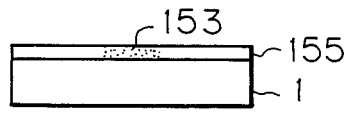

At first a crystalline LiNbO$_3$ substrate 1 as shown in FIG. 45(a) is subjected to the formation of a titanium film 74 as shown in FIG. 45(b), and a titanium film 73 of mesa form is formed in the optical functional part through a mask 72 as shown in FIG. 45(c). The obtained sample is subjected to a thermal treatment for thermally diffusing the titanium film 73 into the substrate, thereby forming a Ti thermal diffusion layer 155 with a high Ti concentration area 153 as shown in FIG. 45(d).

Figure 45E:
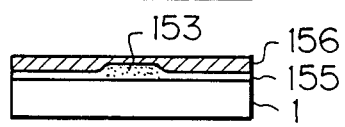
Figure 45F:
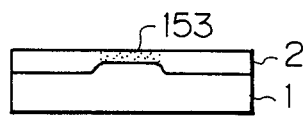
Figure 45G:
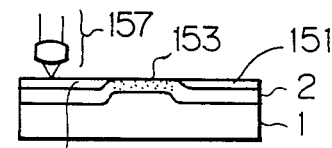

Subsequently a proton exchange layer 156 is formed in the Ti thermal diffusion layer 155 as shown in FIG. 45(e), and is subjected to an annealing treatment to form a light gude 2 having a larger depth of ion injection in the optical connector parts than in the optical functional part as shown in FIG. 45(f). Furthermore, a laser annealing treatment with a CO$_2$ laser 157 is applied to the optical connector parts of the light guide 2 as shown in FIG. 45(g) to form the layers 150, 151 by proton diffusion to the exterior.

Figure 45H:
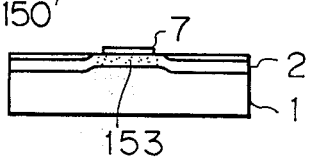

Finally the comb electrodes 7 are formed on the optical functional part as shown in FIG. 45(h).

Figure 46:
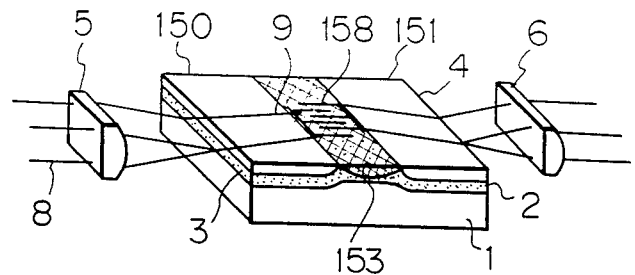
FIGS. 46 to 48 are perspective views respectively showing 32nd to 34th embodiments of the present invention.

FIG. 46 is a perspective view of a 32nd embodiment in which the element shown in FIG. 44 is used as a light deflector utilizing an electro-optical effect. The present embodiment is identical with the 31st embodiment except that the comb electrodes thereof are replaced by comb electrodes 158 for electro-optical effect. In FIG. 46, the same components as those in FIG. 44 are represented by same numbers and will not be explained further. The element of the present embodiment can also be easily prepared by a method shown in FIG. 45.

Figure 47:
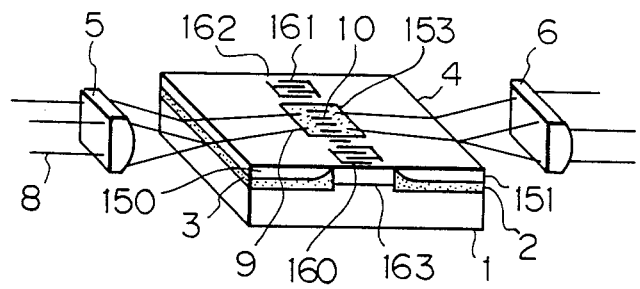

FIG. 47 is a perspective view of a 33rd embodiment of the present invention in which areas 163, 162 free from proton injection are formed in apart of the substrate of the foregoing 31st embodiment and comb electrodes 160, 161 are formed on said areas. In FIG. 47, the same components as those in FIG. 44 are represented by same numbers and will not be explained further. Like the 31st embodiment, the present embodiment achieves a high connection efficiency and a high diffraction efficiency at the same time. Also an efficient modulation or deflection of the guided light is possible with a low electric power, since the absence of proton injection in the areas of comb electrodes prevents the deterioration of the piezoelectric and electro-optical properties in said areas.

The thin film optical element as shown in FIG. 47 can be prepared through a method explained in relation to FIG. 45, except that said proton exchange-free areas are formed in a part of the substrate for the comb electrodes, by forming a mask in said areas prior to the proton exchange treatment.

Figure 48:
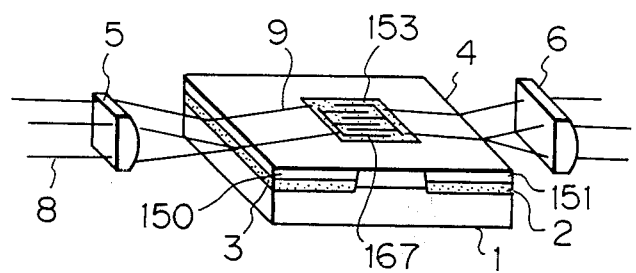

FIG. 48 is a schematic view of a 34th embodiment in which the element shown in FIG. 47 is used as a light deflector utilizing an electro-optical effect. In FIG. 48, the same components as those in FIG. 47 are represented by same numbers and will not be explained further. In the present embodiment, proton injection is absent under the comb electrodes 167 for electro-optical effect. The element of the present embodiment can also be easily prepared by a method similar to the one explained in FIG. 45, in which the comb electrodes are used as a mask for proton exchange.

Though the foregoing embodimens have principally been based on the use of a crystalline substrate of LiNbO$_3$, the thin film optical element of the present invention can be obtained in the same method with a substrate of lithium tantalate (LiTaO$_3$).

Also the light modulation obtained by the thin film optical element of the present invention can be applied not only to the aforementioned light deflectors but also to various optical functional devices. Also the light modulation or deflection can be achieved not only by the aforementioned acousto-optical or electro-optical effect but also by diffraction with a magneto-optically induced magnetostatic surface wave, or by a thermo-optical effect.

What is claimed is:
1. A thin film optical element comprising:
a substrate having surface and an end face;
an optical waveguide formed by ion injection on the surface of said substrate, said waveguide including an optical connector part and an optical functional part;

means for inputting or outputting light to or from said waveguide through said end face, said inputting or outputting means being provided at said optical connector part of said waveguide adjacent said end face of said substate; and means for modulating or deflecting the light at it propagates in said waveguide by varying a refractive index of said optical functional of said waveguide;

wherein the depth of ion injection into said substrate in said optical connector part is different from the depth in said optical functional part, and wherein the depth of ion injection gradually varies from said optical connector part toward said optical functional part so that propagating light is confined in the vicinity of the surface of said substrate at said optical functional part and so that the energy distribution of the propagating light in said optical connector part is broader than the energy distribution in said optical functional part.

2. A thin film optical element according to claim 1, wherein the surface of said substrate is provided with an area free from the ion injection, and said modulating or deflecting means includes electrodes for causing an external effect in said area.

3. A thin film optical element according to claim 1, wherein metal is further thermally diffused in said waveguide.

4. A thin optical element according to claim 3, wherein the concentration of thermally diffused metal is higher in said optical functional part than in said optical connector part.

5. A thin film optical element according to claim 4, wherein the surface of said substrate is provided with an area free from the ion injection, and said modulating or deflecting means includes electrodes for causing and external effect in said area.

6. A thin film optical element according to claim 4, wherein the ion concentration, in the distribution along the direction of thickness of the substrate in said optical connector part, is higher in the interior than in the vicinity of the surface of the substrate.

7. A thin film optical element according to claim 6, wherein the surface of said substrate is provided with an area free from the ion injection, and said modulating or deflecting means includes electrodes for causing an external effect in said area.

8. A thin film optical element according to claim 1, wherein the ion concentration, in the distribution along the direction of thickness of the substrate in said connector part, is higher in the interior than in the vicinity of the surface of the substrate.

9. A thin film optical element according to claim 8, wherein the surface of said substrate is provided with an area free from the ion injection, and said modulating or defeflecting means includes electrodes for causing an external effect in said area.

10. A thing film optical element according to claim 1, wherein the ion concentration in said wave guide is higher in said optical functional part than in said optical connector part.

11. A thin film optical element according to claim 10, wherein the surface of said substrate is provided with an area free from the ion injection, and said modulating or deflecting means includes electrodes for causing an external effect in said area.

12. A thin film optical element according to claim 10, wherein said substrate is composed of lithium niobate crystal or lithium tantalate crystal, and said ion is proton.

13. A thin optical element according to claim 12, wherein the depth of said ion injection is larger in the optical connector part than in the optical functional part.

14. A thin film optical element according to claim 1, wherein said substrate is composed of gallium arsenide.

15. A thin film optical element according to claim 1, wherein said refractive index is varied by an acoustooptical effect.

16. A thin film optical element according to claim 1, wherein said refractive index is varied by an electrooptical effect.

17. A thin film optical element according to claim 1, wherein said ion is thermally diffused into the substrate.

18. A thin film optical element comprising:

a substrate having a surface and an end face;

an optical waveguide formed by ion injection on the surface of said substrate, said waveguide including an optical connector part and an optical functional part;

means for inputting or outputting light to or from said waveguide through said end face, said inputting or outputting means being provided at said optical connector part of said waveguide adjacent said end face of said substrate; and means for modulating or deflecting the light as it propagates in said waveguide by varying a refractive index of said optical functional part of said waveguide;

wherein injected ion concentration in said optical functional part is higher than the ion concentration in said optical connector part, and wherein the concentration gradually varies from said optical connector part toward said optical functional part so that propagating light is confined in the vicinity of the surface of said substrate at said optical functional part and so that the energy distribution of the propagating light in said optical connector part is broader than the energy distribution in said optical functional part.

19. A thin film optical element according to claim 18, wherein the surface of said substrate is provided with an area free from the ion injection, and said modulating or deflecting means includes electrodes for causing an external effect in said area.

20. A thin film optical element according to claim 18, wherein a metal is further thermally diffused in said waveguide.

21. A thin film optical element according to claim 18, wherein the ion concentration, in the distribution along the direction of thickness of the substrate in said optical connector part, is higher in the interior than in the vicinity of the surface of the substrate.

22. A thin film optical element according to claim 21, wherein the surface of said substrate is provided with an area free from the ion injection, and said modulating or deflecting means includes electrodes for causing an external effect in said area.

23. A thin film optical element according to claim 18, wherein said substrate is composed of lithium niobate crystal or lithium tantalate crystal, and said ion is proton.

24. A thin film optical element according to claim 18, wherein said refractive index is varied by an acoustooptical effect.

25. A thin film optical element according to claim 18, wherein said refractive index is varied by an electrooptical effect.

26. A thin film optical element according to claim 18, wherein said ions are thermally diffused into the substate.

27. A thin film optical element comprising:
a substrate having a surface and an end face;
an optical waveguide formed by ion injection on the surface of said substrate, said waveguide including an optical connector part and an optical functional part;
means for inputting or outputting light to or from said waveguide through said end face, said inputting or outputting means being provided at said optical connector part of said waveguide adjacent said end face of said substrate; and
means for modulating or deflecting the light as it propagates in said waveguide by varying a refractive index of said optical functional part if said waveguide;
means ion concentration into said substrate in said optical functional part is higher inside said optical functional part than on the surface of said substrate, and wherein the ion concentration distribution gradually varies from said optical connector part toward said optical functional part so that propagating light is confined in the vicinity of the surface of said substrate at said optical functional part and so that the energy distribution of the propagating light in said optical connector part is broader than the energy distribution in said optical functional part.

28. A thin film optical element according to claim 27, wherein the surface of said substrate is provided with an area free from the ion injection, and said modulating or deflecting means includes electrodes for causing an external effect in said area.

29. A thin film optical element according to claim 27, wherein a metal is further thermally diffused in said waveguide.

30. A thin film optical element according to claim 27, wherein said substrte is composed of lithium niobate crystal or lithium tantalate crystal, and said ion is proton.

31. A thin film optical element according to claim 27, wherein said refractive index is varied by an acoustooptical effect.

32. A thin film optical element according to claim 27, wherein said refractive index is varied by an electrooptical effect.

33. A thin film optical element according to claim 27, wherein said ions are thermally diffused into the substrate.

* * * * *

UNITED STATES PATENT AND TRADEMARK OFFICE
CERTIFICATE OF CORRECTION

PATENT NO. : 4,778,236
DATED : October 18, 1988
INVENTOR(S) : MAMORU MIYAWAKI

It is certified that error appears in the above-identified patent and that said Letters Patent is hereby corrected as shown below:

IN [56] OTHER PUBLICATIONS

Under Heibei et al, "Fabricataed" should read --Fabricated--.

COLUMN 2

Line 2, "elements" should read --element--.
Line 7, "have" should read --has--.

COLUMN 4

Line 49, "[$CH_3(CH_{26})_{16}COOH$]" should read --[$CH_3(CH_2)_{16}COOH$]--.

COLUMN 6

Line 9, "same" should read --the same--.
Line 33, "same" should read --the same--.

COLUMN 7

Line 2, "embodment," should read --embodiment,--.
Line 16, "same" should read --the same--.

COLUMN 9

Line 17, "same" should read --the same--.

UNITED STATES PATENT AND TRADEMARK OFFICE
CERTIFICATE OF CORRECTION

PATENT NO. : 4,778,236
DATED : October 18, 1988
INVENTOR(S) : MAMORU MIYAWAKI

It is certified that error appears in the above-identified patent and that said Letters Patent is hereby corrected as shown below:

COLUMN 10

Line 51, "same" should read --the same-- and "not explained" should read --not be explained--

COLUMN 11

Line 56, "same" should read --the same--.
    Line 66, "at" should read --as--.

COLUMN 12

Line 10, "same" should read --the same--.
    Line 30, "same" should read --the same--.

COLUMN 13

Line 67, "same" should read --the same--.

COLUMN 14

Line 28, "same" should read --the same--.
    Line 48, "same number" should read --the same numbers--.

COLUMN 16

Line 16, "same" should read --the same--.
    Line 39, "same" should read --the same--.
    Line 58, "same" should read --the same--.

UNITED STATES PATENT AND TRADEMARK OFFICE
CERTIFICATE OF CORRECTION

PATENT NO. : 4,778,236
DATED : October 18, 1988
INVENTOR(S) : MAMORU MIYAWAKI

It is certified that error appears in the above-identified patent and that said Letters Patent is hereby corrected as shown below:

COLUMN 17

Line 13, "same" should read --the same--.
    Line 22, "optioal" should read --optical--.
    Line 24, "of surface" should read --of the surface--.
    Line 58, "duffusion layer 11" should read
        --diffusion layer 11--.

COLUMN 18

Line 15, "same" should read --the same--.
    Line 23, "same" should read --the same--.
    Line 43, "same" should read --the same--.
    Line 56, "same" should read --the same--.

COLUMN 19

Line 35, "same" should read --the same--.
    Line 45, "same" should read --the same--.
    Line 64, "same" should read --the same--.

COLUMN 20

Line 10, "same" should read --the same--.
    Line 33, "Ti termal" should read --Ti thermal--.
    Line 56, "same" should read --the same--.
    Line 61, "form" should read --from--.
    Line 64, "same" should read --the same--.
    Line 65, "same" should read --the same--.

UNITED STATES PATENT AND TRADEMARK OFFICE
CERTIFICATE OF CORRECTION

PATENT NO. : 4,778,236
DATED : October 18, 1988
INVENTOR(S) : MAMORU MIYAWAKI

It is certified that error appears in the above-identified patent and that said Letters Patent is hereby corrected as shown below:

COLUMN 21

Line 16, "same" should read --the same--.
    Line 30, "same" should read --the same--.
    Line 46, "first element," should read --first embodiment,--

COLUMN 22

Line 12, "same" should read --the same--.
    Line 17, "apart" should read --a part--.
    Line 21, "same" should read --the same--.
    Line 40, "same" should read --the same--.
    Line 47, "embodimens" should read --embodiments--.
    Line 64, "surface" should read --a surface--.

COLUMN 23

Line 6, "at" should read --as--.
    Line 8, "optical functional" should read --optical functional part--
    Line 29, "thin optical element" --thin film optical
    Line 36, "and" should
    Line 50, "said con-"
    Line 58, "thing"

Signed and Sealed this

Twelfth Day of September, 1989

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,778,236
DATED : October 18, 1988
INVENTOR(S) : MAMORU MIYAWAKI

Page 5 of 5

It is certified that error appears in the above-identified patent and that said Letters Patent is hereby corrected as shown below:

COLUMN 24

Line 3, "thin optical element" should read
--thin film optical element--.

COLUMN 25

Line 20, "if" should read --of--.
Line 22, "means" should read --wherein--.

COLUMN 26

Line 15, "substrte" should read --substrate--.

Signed and Sealed this

Twelfth Day of September, 1989

Attest:

DONALD J. QUIGG

*Attesting Officer*   *Commissioner of Patents and Trademarks*